United States Patent
Kusakabe et al.

(10) Patent No.: US 7,390,347 B2
(45) Date of Patent: Jun. 24, 2008

(54) ZEOLITE MEMBRANES FOR SELECTIVE OXIDATION OF CARBON MONOXIDE IN MIXED HYDROGEN GAS SOURCE

(75) Inventors: Katsuki Kusakabe, Fukuoka (JP); Yasuhisa Hasegawa, Fukuoka (JP); Shigeharu Morooka, Fukuoka (JP); Yasunori Ando, Nagoya (JP)

(73) Assignee: Noritake Co., Ltd., Nagoya (JP)

( * ) Notice: Subject to any disclaimer, the term of this patent is extended or adjusted under 35 U.S.C. 154(b) by 0 days.

(21) Appl. No.: 11/620,441

(22) Filed: Jan. 5, 2007

(65) Prior Publication Data

US 2007/0110649 A1 May 17, 2007

Related U.S. Application Data

(62) Division of application No. 10/333,215, filed as application No. PCT/JP01/06772 on Aug. 7, 2001, now abandoned.

(30) Foreign Application Priority Data

Aug. 7, 2000 (JP) ............................. 2000-238704

(51) Int. Cl.
- *B01D 53/22* (2006.01)
- *B01D 67/00* (2006.01)
- *B01D 71/02* (2006.01)
- *B01D 53/62* (2006.01)
- *B01J 29/06* (2006.01)

(52) U.S. Cl. ............... 95/45; 95/55; 96/4; 96/11; 55/524; 55/DIG. 5; 502/4; 502/64; 502/66; 502/74; 502/325; 423/247

(58) Field of Classification Search ............ 95/45, 95/55, 56; 96/4, 7, 11; 55/524, DIG. 5; 210/640, 210/651, 500.25; 502/4, 64, 66, 70, 74, 325; 423/210, 247

See application file for complete search history.

(56) References Cited

U.S. PATENT DOCUMENTS 4,699,892 A * 10/1987 Suzuki ........................ 502/4
4,865,630 A * 9/1989 Abe ............................. 96/11

(Continued)

FOREIGN PATENT DOCUMENTS

| EP | 0 855 210 A2 | 1/1998 |
| EP | 1 029 593 A1 | 8/2000 |
| JP | 62-160121 | 7/1987 |

(Continued)

OTHER PUBLICATIONS

Tavolaro et al., "Zeolite Membranes." Advanced Materials, VCH Verlagsgesellschaft, Weinheim, DE, vol. 11, No. 12, pp. 975-996, 1999.

(Continued)

*Primary Examiner*—Jason M Greene
(74) *Attorney, Agent, or Firm*—Oliff & Berridge, PLC

(57) ABSTRACT

Methods and apparatus are taught for selectively oxidizing carbon monoxide in a source of gas containing carbon monoxide and hydrogen. A gas containing carbon monoxide and hydrogen is fed into a membrane reactor (10, 50, 60) capable of selectively absorbing the carbon monoxide. Preferably, the reactor comprises a substantially defect-free zeolite membrane (4) having at one metal that acts as an oxidation catalyst. The zeolite membrane (4) may be supported on a porous ceramic support (2, 52, 61) and the average pore diameter is preferably between about 0.3 nm and about 1.0 nm. Moreover, the substantially defect-free zeolite membrane (4) preferably has a thickness between about 0.1 micron and about 50.0 microns. The at least one metal is preferably capable of selectively oxidizing the carbon monoxide and is preferably platinum. Preferably, the temperature of reactor housing is maintained at about 200-300° C.

10 Claims, 12 Drawing Sheets

U.S. PATENT DOCUMENTS

| | | | | |
|---|---|---|---|---|
| 5,110,478 A | * | 5/1992 | Haag et al. | 210/650 |
| 5,612,274 A | * | 3/1997 | Wu et al. | 502/325 |
| 5,618,435 A | | 4/1997 | Fehlner et al. | |
| 5,702,838 A | | 12/1997 | Yasumoto et al. | |
| 5,716,527 A | | 2/1998 | Deckman et al. | |
| 5,744,035 A | | 4/1998 | Geus et al. | |
| 5,753,014 A | * | 5/1998 | Van Rijn | 55/524 |
| 5,753,121 A | | 5/1998 | Geus et al. | |
| 5,779,904 A | * | 7/1998 | Ruderman et al. | 210/500.25 |
| 5,849,980 A | | 12/1998 | Lai | |
| 5,871,650 A | | 2/1999 | Lai et al. | |
| 5,874,051 A | | 2/1999 | Heil et al. | |
| 5,895,769 A | | 4/1999 | Lai | |
| 5,904,913 A | | 5/1999 | Bohm et al. | |
| 5,932,361 A | | 8/1999 | Belyakov et al. | |
| 5,942,119 A | | 8/1999 | Deckman et al. | |
| 5,955,395 A | | 9/1999 | Andorf et al. | |
| 6,042,727 A | | 3/2000 | Jones et al. | |
| 6,043,177 A | | 3/2000 | Falconer et al. | |
| 6,129,861 A | | 10/2000 | Meusinger et al. | |
| 6,133,185 A | | 10/2000 | Kinugasa et al. | |
| 6,140,263 A | | 10/2000 | Anstett et al. | |
| 6,159,542 A | * | 12/2000 | Kondo et al. | 502/4 |
| 6,165,336 A | * | 12/2000 | Maki et al. | 204/415 |
| 6,168,772 B1 | | 1/2001 | Watanabe | |
| 6,190,430 B1 | | 2/2001 | Fukuoka et al. | |
| 6,193,784 B1 | | 2/2001 | Yazawa et al. | |
| 6,197,427 B1 | | 3/2001 | Anstett et al. | |
| 6,245,214 B1 | | 6/2001 | Rehg et al. | |
| 6,254,848 B1 | | 7/2001 | Autenrieth et al. | |
| 6,299,744 B1 | * | 10/2001 | Narayanan et al. | 204/263 |
| 6,338,833 B1 | * | 1/2002 | Aasberg-Petersen | 423/652 |
| 6,350,297 B1 | * | 2/2002 | Doyle et al. | 95/55 |
| 6,767,384 B1 | * | 7/2004 | Vu et al. | 95/45 |
| 7,169,213 B2 | * | 1/2007 | Liu et al. | 96/4 |

FOREIGN PATENT DOCUMENTS

| | | |
|---|---|---|
| JP | 7-505333 | 6/1995 |
| JP | 08-071384 | 3/1996 |
| JP | 10-202107 | 1/1997 |
| JP | A 9-202615 | 8/1997 |
| JP | A 10-036114 A | 2/1998 |
| JP | A 11-108918 | 4/1999 |
| JP | A 11-137981 | 5/1999 |
| JP | A 2000-109690 | 4/2000 |
| JP | A 2000-126564 | 5/2000 |
| WO | WO 93/19841 | 10/1993 |
| WO | WO 97/25272 | 7/1997 |
| WO | WO 97/43207 | 11/1997 |
| WO | WO 97/43796 | 11/1997 |

OTHER PUBLICATIONS

Igarashi et al., "Removal of carbon monoxide from hydrogen-rich fuels by selective oxidation over platinum catalyst supported on zeolite," Applied Catalysis A: vol. 159, pp. 159-169, 1997.

Bein, "Synthesis and Applications of Molecular Sieve Layers and Membranes," Chemistry of Materials, American Chemical Society, Washington, US, vol. 8, No. 8, pp. 1636-1653, Aug. 1, 1996.

Casanave et al., "Zeolite membrane reactor for isobutane dehydrogenation: Experimental results and theoretical modelling," Chemical Engineering Science 54, pp. 2807-2815, 1999.

Wang et al., "Photocatalysis of Metal Clusters in Cages: Effective Photoactivation of the Water Gas Shift Reaction catalysed on NaY Zeolite-entrapped $Pt_{12}$ and $Pt_9$ Carbonyl Clusters," J. Chem Soc. Chem. Commun., pp. 962-963, 1992.

Igarashi et al., "Hydrogen electro-oxidation on platinum catalysts in the presence of trace carbon monoxide," Journal of Electroanalytical Chemistry 391, pp. 119-123, 1995.

Kusakabe et al., "Formation of a Y-Type Zeolite Membrane on a Porous α-Alumina Tube for Gas Separation," Ind. Eng. Chem. Res. 36, pp. 649-655, 1997.

Kusakabe et al., "Gas Permeation Properties of Ion-Exchanged Faujasite-Type Zeolite Membranes," AIChE Journal, vol. 45, No. 6, pp. 1220-1226, Jun. 1999.

Kusakabe et al., "Separation of carbon dioxide from nitrogen using ion-exchanged faujasite-type zeolite membranes formed on porous support tubes," Journal of Membrane Science 148, pp. 13-23, 1998.

Coronas et al., "Catalytic reactors based on porous ceramic membranes," Catalysis Today 51, pp. 377-389, 1999.

Japanese Notification and Translation of Notification, Apr. 13, 2006.

Japanese Notification and Translation of Notification, Jul. 13, 2006.

\* cited by examiner

FIG.5 Reactor Temperature = 150°C
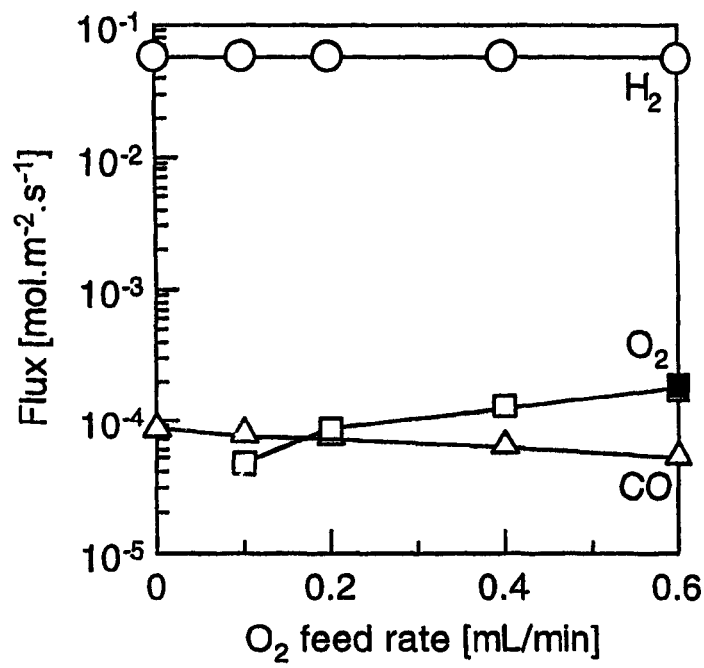
FIG.6 Reactor Temperature = 175°C
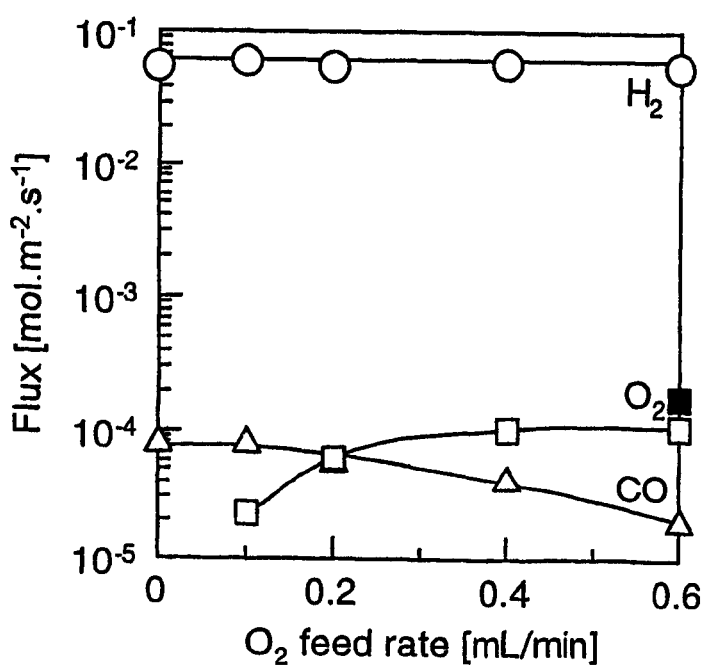

FIG. 7    Reactor Temperature = 200°C
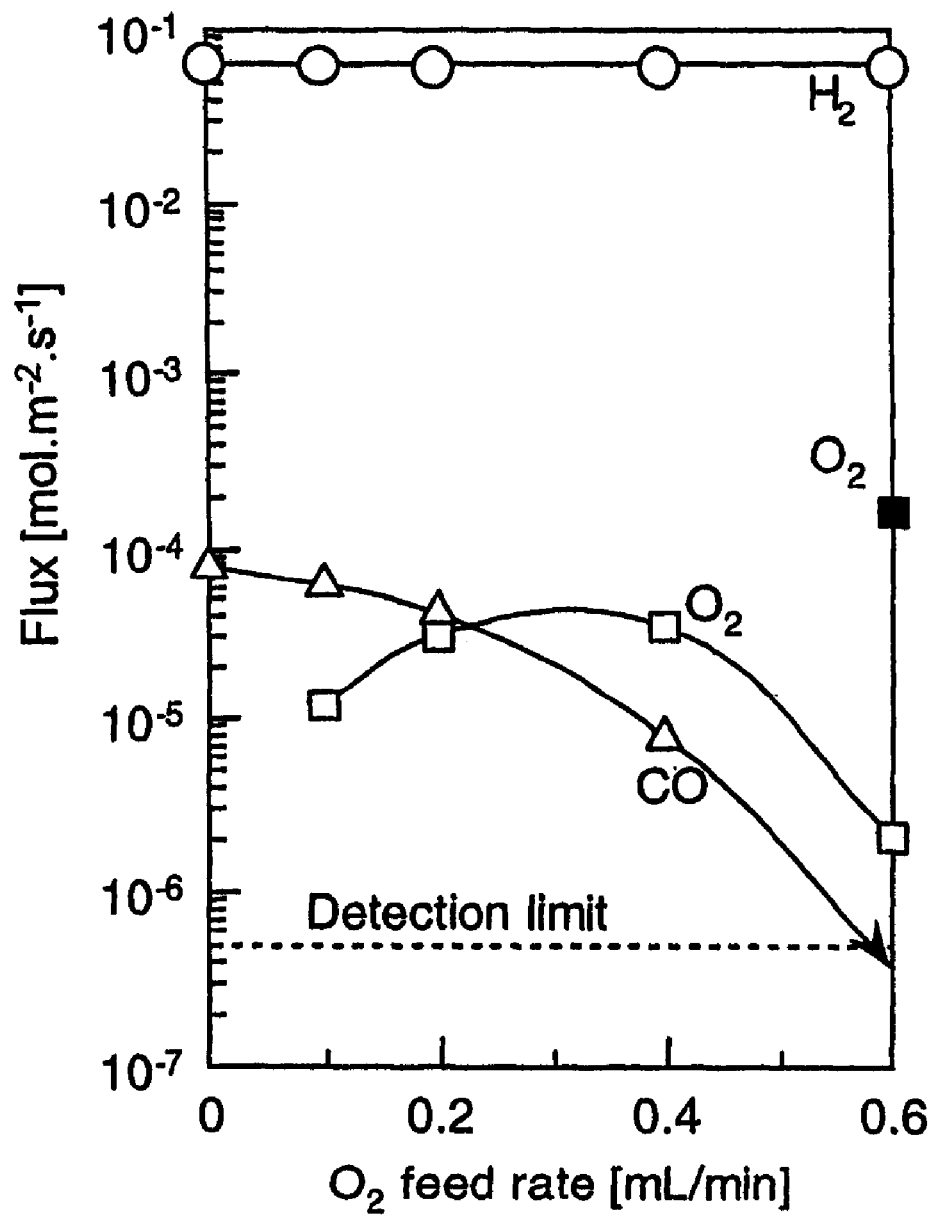

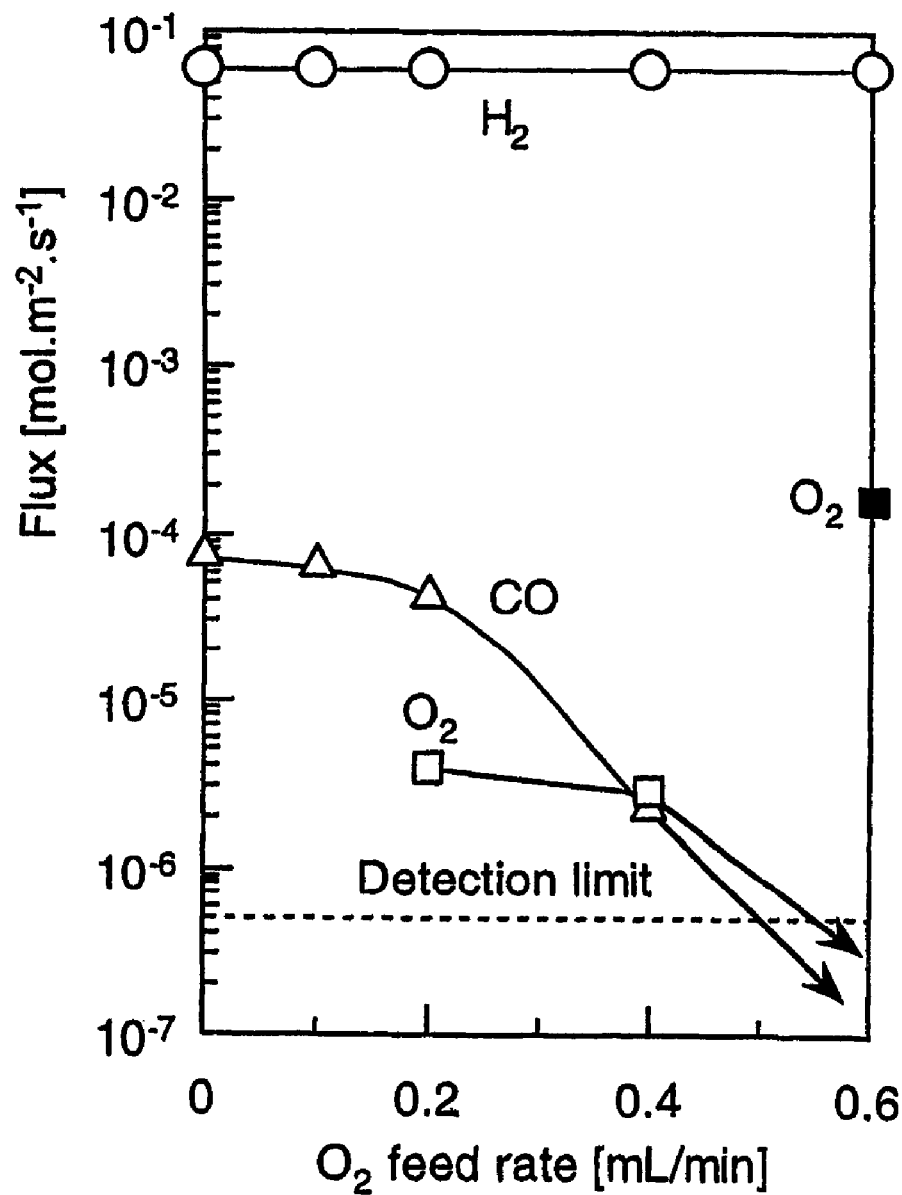
FIG.8  Reactor Temperature = 225°C

FIG.9  Reactor Temperature = 250°C
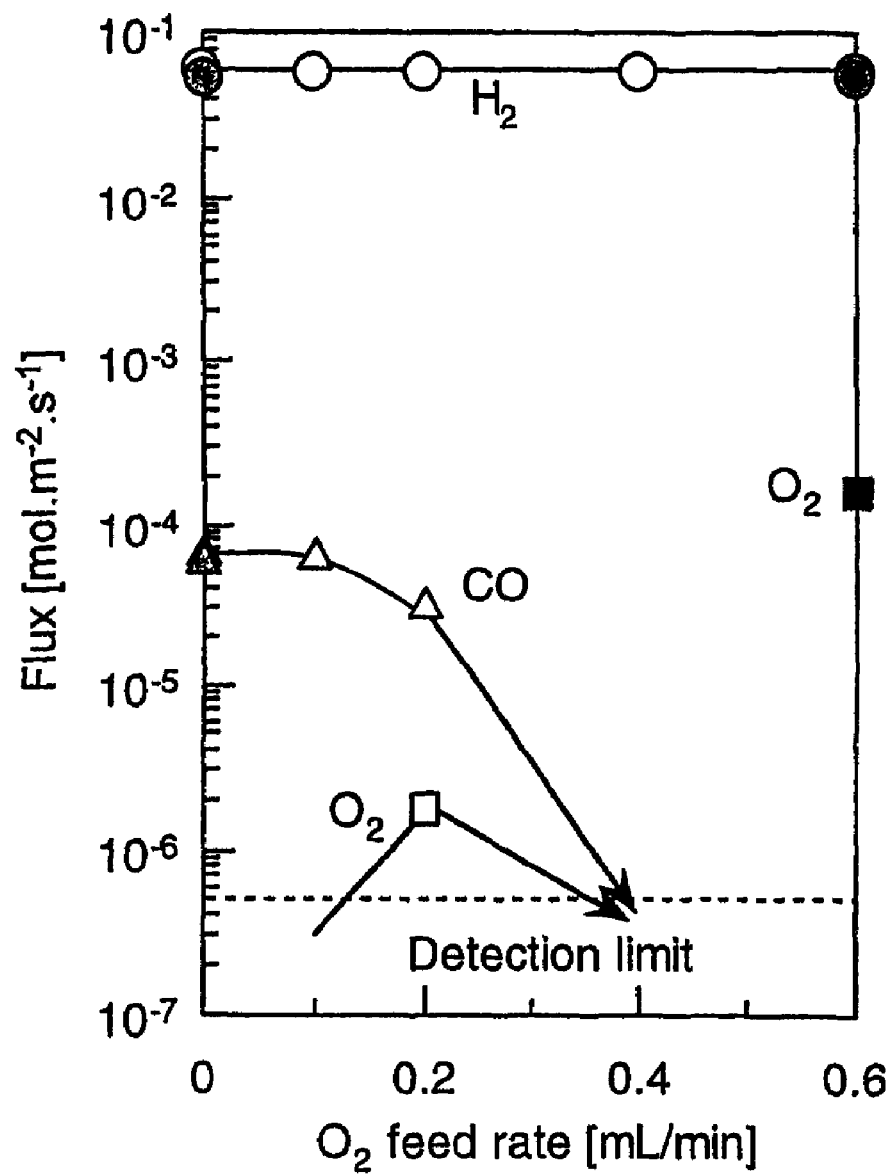

FIG.13
(a)
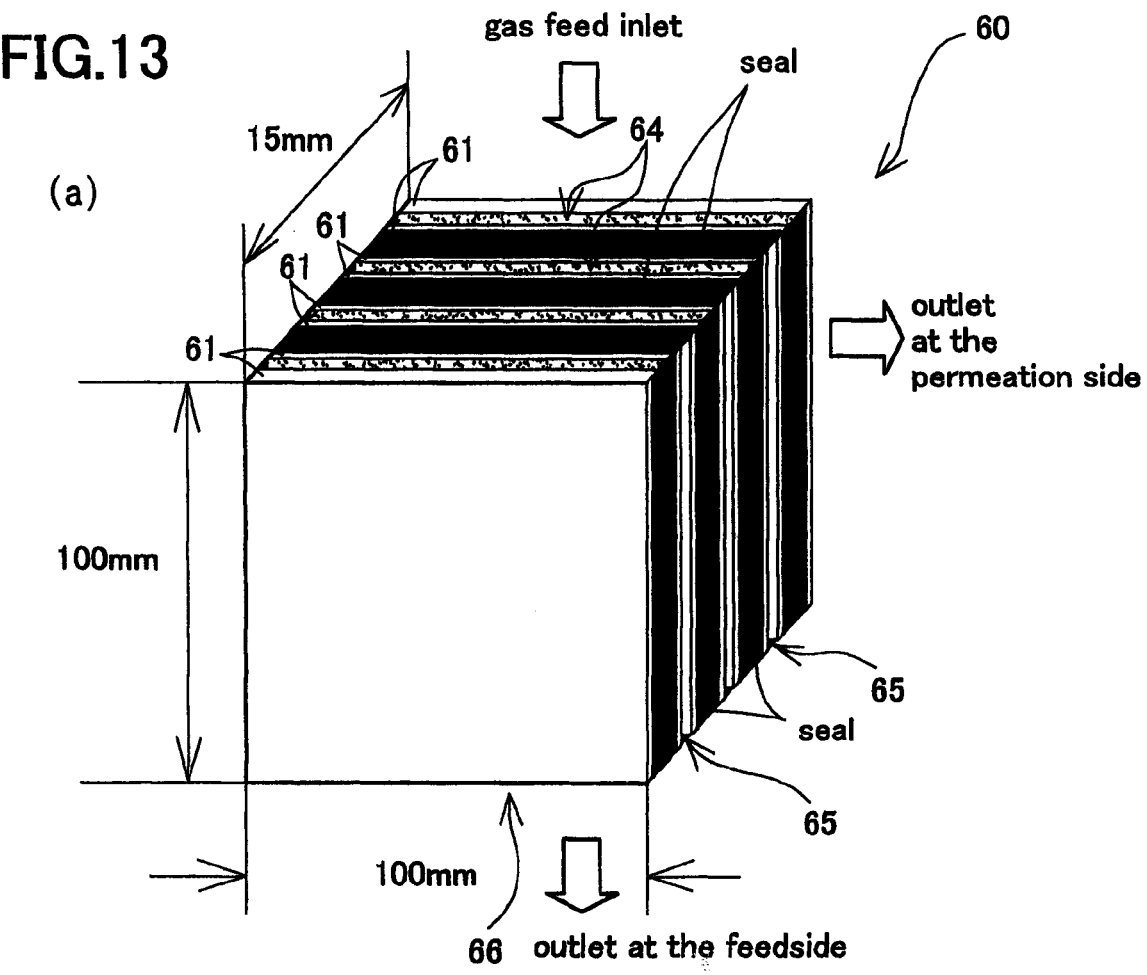
(b)
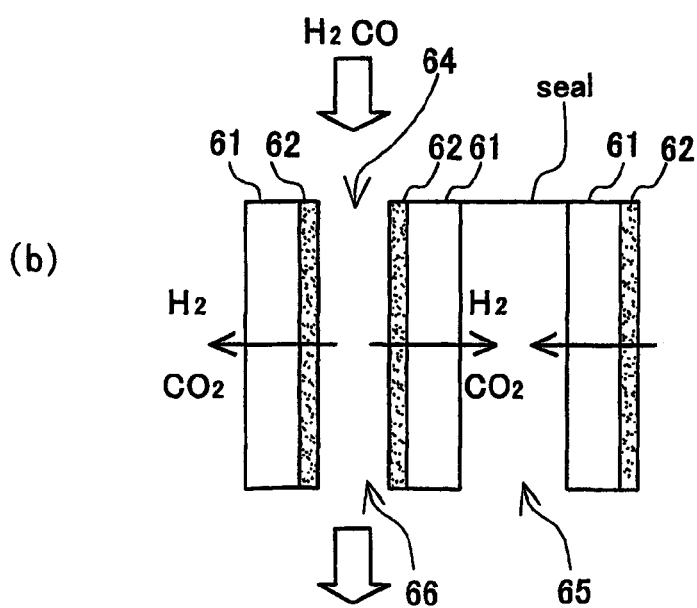

ZEOLITE MEMBRANES FOR SELECTIVE OXIDATION OF CARBON MONOXIDE IN MIXED HYDROGEN GAS SOURCE

This is a Division of application Ser. No. 10/333,215 filed on Feb. 3, 2003 now abandoned. The disclosure of the prior application is incorporated herein by reference in its entirety. The parent application is a national stage of PCT/JP01/06772 filed on Aug. 7, 2001, which is also incorporated by reference in its entirety. This application claims priority to Japanese patent application 2000-238704, filed on Aug. 7, 2000, the disclosure of which is expressly incorporated herein by reference.

BACKGROUND OF THE INVENTION

1. Field of the Invention

The present invention generally relates to zeolite membranes impregnated with one or more oxidation catalysts. Such zeolite membranes are capable of selectively oxidizing and/or removing carbon monoxide and other oxidizable gas molecules contained in a hydrogen gas source. In one preferred aspect, the present invention also relates to devices for producing a hydrogen gas source that is substantially free of carbon monoxide, which hydrogen gas source may be utilized with a fuel cell for generating electric energy, such as a fuel cell for a vehicle.

2. Description of Related Art

Fuel cells are currently being developed in order to more efficiently utilize hydrocarbon resources and such fuel cells are expected to be utilized in environmentally friendly fuel cells, such as e.g., electrically powered vehicles. Such fuel cells typically utilize hydrogen that is produced by a steam reforming reaction, for example, of methanol ($CH_3OH + H_2O \rightarrow CO_2 + 3H_2$) in a reformer. However, the reformed gas produced by the reformer also usually contains a small amount of carbon monoxide (usually 1-2%) that is produced by a reverse shift reaction ($CO_2 + H_2 \rightarrow CO + H_2O$). Because many current fuel cell designs utilize a platinum electrode catalyst, the presence of carbon monoxide in the reformed gas will poison the platinum electrode catalyst and can substantially reduce the efficiency of the fuel cell. Therefore, it is highly desirable to deliver a hydrogen gas source to the fuel cells that is substantially free of carbon monoxide (i.e. less than 50 ppm of carbon monoxide and more preferably less than 10 ppm of carbon monoxide).

Micro-porous hydrogen separation membranes consisting of a thin film of palladium have been utilized to prepare substantially pure hydrogen gas sources. Such palladium thin films selectively allow hydrogen gas to pass through the film, but do not permit other molecules to pass. Therefore, highly pure hydrogen gas sources can be produced with such palladium thin films. However, palladium is a precious metal and such palladium films can be very expensive to produce. Therefore, such palladium films are not economical for use in fuel cells that may be utilized, e.g., in automobiles.

A zeolite membrane has also been proposed in Japanese Laid-open Patent Publication no. 10-36114, which zeolite membrane is formed on a porous support. This zeolite membrane was successfully utilized to selectively separate carbon dioxide gas from a mixture of nitrogen and carbon dioxide gases. It is believed that such zeolite membranes may have higher retention times for polar gases than for non-polar gases.

Zeolite catalysts impregnated with platinum have also been described in U.S. Pat. Nos. 5,702,838, 5,874,051 and 5,955,395 for selectively oxidizing carbon monoxide in a mixture of hydrogen and carbon monoxide gases. However, these publications describe a bed reactor, in which a zeolite powder is packed into a carrier structure. Although good results are described with these techniques, bed reactors are inherently inefficient, because the gas mixture can pass over the catalyst without being forced to contact the catalyst. Thus, such catalytic systems will have difficulty to produce hydrogen gas sources that are substantially free of carbon monoxide (i.e. less than 50 ppm of carbon monoxide). Also, in order to increase the opportunity for the gas mixture to contact the catalyst, such bed reactors require a relatively large amount of precious metals and thus, are not cost-effective.

Zeolite membranes impregnated with noble metal catalysts have been suggested in several references, e.g., U.S. Pat. Nos. 5,618,435, 5,716,527, 5,779,904, 5,871,650, 5,895,769, 5,849,980 and 5,942,119. However, none of these references suggests the use of such zeolite membranes for selectively oxidizing carbon monoxide in a mixture of hydrogen and carbon monoxide gases. Further, none of these references teaches an example of the actual preparation of such a zeolite membrane impregnated with a noble metal catalyst, or has described the properties of such a zeolite membrane.

SUMMARY OF THE INVENTION

It is, accordingly, one object of the present invention to overcome one or problems of the prior art. In one embodiment of the present teachings, zeolite membranes are taught that can be utilized to produce hydrogen gas sources that are substantially free of carbon monoxide.

In one aspect of the present teachings, zeolite membranes are taught that have molecule permselectivity. That is, the zeolite membranes are capable of separating and/or removing oxidizable gas molecules with high accuracy (specificity), while providing a comparatively high gas permeation flow rate (gas treatment speed) sufficient for practical applications. Oxidizable gas molecule include gasified organic compounds or gas molecules that can be oxidized utilizing platinum and/or other oxidation catalysts.

In another aspect of the present teachings, porous ceramic membranes are taught that have gas-permeable fine pores. Preferably, at least one metal catalyst is incorporated into the porous ceramic membrane and the metal catalyst preferably acts as an oxidation catalyst. In another aspect of the present teachings, the porous ceramic membrane comprising a metal catalyst is formed on the surface of an inorganic porous support. Such porous ceramic membranes preferably provide molecular permselectivity, because the gas-permeable fine pores absorb certain gases more readily than other gases.

For example, when the present zeolite membranes are utilized at ambient temperatures, polar gases (e.g. carbon monoxide and other oxides, such as nitrogen oxides) are believed to be more readily absorbed by the fine pores of the zeolite membrane than non-polar gases (e.g. hydrogen gas). In addition, at higher temperatures such as 100-200° C. or more, the present zeolite membranes are believed to provide molecule selective gas permeability due to a molecular sieve effect, which is due to the presence of fine pores of a molecule level size that are distributed over the zeolite surface. As a result, the retention rate of the polar gases in the zeolite membrane is much greater than the non-polar gases. By incorporating a metal catalyst, such as a noble metal (e.g. platinum), into the fine pores, the polar gases can be selectively oxidized. Thus, for example, if a mixture of carbon monoxide and hydrogen gases is passed through a zeolite membrane impregnated with platinum, the carbon monoxide is selectively oxidized to carbon dioxide, even if hydrogen is present in excess of the carbon monoxide. In fact, even though platinum is utilized as the catalyst and platinum is well known to catalyze the oxidation of hydrogen in the presence of oxygen, substantially no hydrogen is oxidized by the present zeolite membranes.

As a result, carbon monoxide or other harmful components in a mixed hydrogen gas source can be selectively oxidized and converted into other harmless molecule species (e.g. carbon dioxide) by permeating the mixed hydrogen gas source through the fine pores of the zeolite membrane. Further, because the mixed hydrogen gas source must pass through the fine pores of the zeolite membrane, such a structure is far more efficient than bed reactors comprising zeolite powders. That is, because the mixed hydrogen gas source is forced to pass through the fine pores, the harmful components (e.g. carbon monoxide) are more likely to contact the surface of the zeolite material and thus more likely to be absorbed by the zeolite membrane than a zeolite powder. Consequently, the oxidation of the harmful component can be performed more efficiently, thereby substantially reducing the amount of such harmful components in the hydrogen gas source.

Moreover, the present zeolite membranes can be very thin (e.g. 1-50 microns and more preferably 5-20 microns) and require only a small amount of the noble metal catalyst (e.g. 1-10% by weight). Thus, by reducing the amount of metal catalyst, which can be very expensive, the overall cost of the system can be substantially reduced as compared to bed reactors filled with zeolite powder. Moreover, the pore size of such zeolite membranes permits relatively high gas permeation flow rates. Therefore, suitable zeolite membrane reactors can be utilized for practical applications, such as preparing hydrogen gas sources that are substantially free of carbon monoxide for various fuel cell applications.

In another aspect, zeolite membranes comprise fine pores that have the property of being less permeable to carbon monoxide than to hydrogen. The average size of the fine pores preferably selectively permeates hydrogen gas over other harmful components, such as carbon monoxide. In one preferred aspect of the present teachings, the average pore diameter of the zeolite membrane is between about 0.3-1.0 nm and more preferably, the average pore diameters are between about 0.3-0.9 nm. Further, these zeolite membranes can be utilized to prepare membrane reactors for selectively removing carbon monoxide from a mixed hydrogen gas source.

For example, such zeolite membranes can selectively reduce the membrane permeation flow rate of carbon monoxide vis-à-vis hydrogen. In other words, these zeolite membranes have a retention rate for carbon monoxide that is significantly greater than hydrogen, preferably at least about 10 times greater for carbon monoxide than hydrogen. By incorporating a material (e.g. oxidation catalyst) into the zeolite membrane that oxidizes carbon monoxide, the carbon monoxide can be efficiently and selectively oxidized as the carbon monoxide permeates the zeolite membrane. Consequently, carbon monoxide can be removed from a mixed hydrogen gas source with high efficiency and selectivity.

In another aspect of the present teachings, the thickness of the zeolite membrane is preferably between about 0.1-50 microns and more preferably, between about 1.0-20 microns. Moreover, the zeolite membrane is preferably includes a defect-free ceramic layer and the thickness of the defect-free layer is preferably at least about 1.0-5.0 microns. A defect-free zeolite membrane is intended to mean a continuous layer of zeolite material that is substantially free of cracks or fissures. Therefore, the gas molecules must pass through the fine pores of the zeolite membrane in order to transverse the zeolite membrane and can not simply pass over the zeolite material without contact, as is possible with zeolite powders utilized in bed reactors.

Thus, by providing a defect-free zeolite layer, the mixed hydrogen gas source must pass through the fine pores of the zeolite membrane, which increases the opportunity for the zeolite material to contact the oxidizable molecules. Thus, a continuous, substantially defect-free zeolite layer increases the absorption of harmful components (e.g. carbon monoxide) in the zeolite membrane and thus, increases the efficiency of the oxidation catalyst disposed within the zeolite membrane. In addition to the manufacturing techniques described herein, other techniques for preparing a continuous, substantially defect-free zeolite membrane are known in the art.

As discussed above, a zeolite is the preferred substance for the membrane. Porous zeolite membranes can be prepared that have a property of more readily absorbing polar molecules, such carbon monoxide, than non-polar molecules, such as hydrogen. This property is believed to be based upon the molecular sieve properties inherent to zeolites.

In another aspect of the present teachings, the zeolite membrane is supported by a porous support of another material, which preferably may be a porous ceramic material although porous metal supports and other similar porous materials can be advantageously utilized with the present teachings.

For example, the zeolite membrane may be coated onto the surface of a porous support. Because the zeolite membrane can be very thin (e.g. about 1-50 microns in thickness), the porous support may be utilized to provide mechanical strength to the zeolite membrane. Thus, the porous support preferably increases the durability of the zeolite membrane without decreasing the gas permeation rates through the membrane structure. A membrane reactor may be formed by supporting the zeolite membrane on the porous support in a membrane reaction module (unit). Such membrane reactors may have excellent strength and stability and can be employed in gas oxidation reactor apparatus of various types and sizes. Again, such membrane reactors may be preferably utilized in an apparatus that separates and/or removes harmful gas components, e.g. carbon monoxide, from a mixed hydrogen gas source.

Preferred zeolite membranes provide selective gas permeability due to the adsorption and/or molecular sieve properties of the fine pores (i.e. molecular size pores), which are distributed over the zeolite membrane surface. Moreover, the oxidation and removal of oxidizable gas molecules during permeation through the membrane can be conducted with high efficiency via the oxidation catalyst supported on the outer surface of the membrane and/or on the inner wall surface of the fine pores. Due to the gas separation capacity of the zeolite membrane itself and its capacity as an oxidation catalyst, the present zeolite membranes have excellent molecule permselectivity.

In another preferred aspect of the present teachings, the zeolite membrane preferably comprises a Y-type zeolite. Such Y-type zeolite membranes preferably comprise fine pores that are distributed over the membrane surface. Such fine pores have desirable properties and sizes so as to restrict the permeation of polar molecules of a relatively large size, such as carbon monoxide molecules, with respect to permeation of non-polar molecules of a small size, such as hydrogen molecules. Therefore, Y-type zeolite membranes can be effectively utilized to selectively absorb polar molecules, such as carbon monoxide. By incorporating an oxidation catalyst, such as a noble metal, in to the Y-type zeolite membrane, carbon monoxide, for example, can be selectively oxidized in a mixed hydrogen gas.

Representative methods of making zeolite membranes having excellent molecule permselectivity are also provided herein. For example, a zeolite membrane (e.g. a Y-type zeolite membrane) may be coated onto the surface of a porous support. Accordingly, zeolite particles are caused to adhere to the surface of a porous support. At least one composition that can catalyze the oxidation of carbon monoxide to carbon dioxide is then preferably incorporated or impregnated into the zeolite membrane. Preferably, noble metals are utilized to catalyze this reaction and for example, various transition metals, such as but not limited to platinum, may be incorporated into the zeolite membrane.

The present zeolite membranes may preferably be utilized in a system for selectively removing carbon monoxide from a mixed hydrogen gas source. When for example methanol is subjected to a methanol reforming reactor, various gas components are formed, including hydrogen, carbon monoxide, and carbon dioxide. In addition, un-reacted methanol and water vapor may remain in the mixture. Thus, while hydrogen gas is the primary component of this mixture, various other gaseous components are included. Therefore, according to the present specification, one example of a "mixed hydrogen gas source" is the gas components generated when methanol is reformed according to known reformation techniques. In particular, a "mixed hydrogen gas source" preferably includes hydrogen as a primary component, but may include various other unessential gas components, such as carbon monoxide, carbon dioxide and water vapor. However, it should be noted that a "mixed hydrogen gas source" can mean any gaseous mixture that comprises hydrogen as a primary component, but also includes other gaseous components that are preferably removed and/or oxidized in order to increase the purity of the hydrogen gas.

Thus, in another aspect of the present teachings, a mixed hydrogen gas source may be forcibly passed (e.g. under pressure) through a zeolite membrane comprising an oxidation catalyst. Another source of oxygen may be provided, such as for example oxygen gas, air containing oxygen or water vapor that may be hydrolyzed to release excess oxygen. The additional oxygen can be utilized to oxidize the carbon monoxide to carbon dioxide. By forcing the entire mixed hydrogen gas source through the present zeolite membranes, harmful components, such as carbon monoxide, can be selectively oxidized with high selectivity and efficiency. According to experiments described in further detail below, carbon monoxide can be reduced to below current detection levels (i.e. about 8 ppm). However, no substantial oxidation of hydrogen gas was noted. Thus, the present zeolite membranes can be utilized in reactor systems for efficiently producing a hydrogen gas source that is substantially free of carbon monoxide. Thus, for example, such membrane reactors will be highly useful to prepare appropriate hydrogen gas sources for fuel cells. Naturally, such membrane reactors can be constructed in various ways and some representative examples will be described below.

Other objects, features and advantages of the present teachings will become apparent upon further review of the following description, claims and drawings.

BRIEF DESCRIPTION OF THE DRAWINGS

FIG. 5 is a graph illustrating the relationship between the flow rate of hydrogen, carbon monoxide, and oxygen permeation through a PtY-type zeolite membrane at a temperature of 150° C.

FIG. 6 is a graph illustrating the relationship between the flow rate of hydrogen, carbon monoxide, and oxygen permeation through a PtY-type zeolite membrane at a temperature of 175° C.

FIG. 7 is a graph illustrating the relationship between the flow rate of hydrogen, carbon monoxide, and oxygen permeation through a PtY-type zeolite membrane at a temperature of 200° C.

FIG. 8 is a graph illustrating the relationship between the flow rate of hydrogen, carbon monoxide, and oxygen permeation through a PtY-type zeolite membrane at a temperature of 225° C.

FIG. 9 is a graph illustrating the relationship between the flow rate of hydrogen, carbon monoxide, and oxygen permeation through a PtY-type zeolite membrane at a temperature of 250° C.

FIG. 13 shows a multi-layer plate type gas separation module, in which FIG. 13(*a*) is a schematic drawing showing a representative structure for a multi-layer plate reactor and FIG. 13(*b*) is a cross-sectional view schematically showing the flow and permeation of the feed gas.

DETAILED DESCRIPTION OF THE INVENTION

Figure 1:
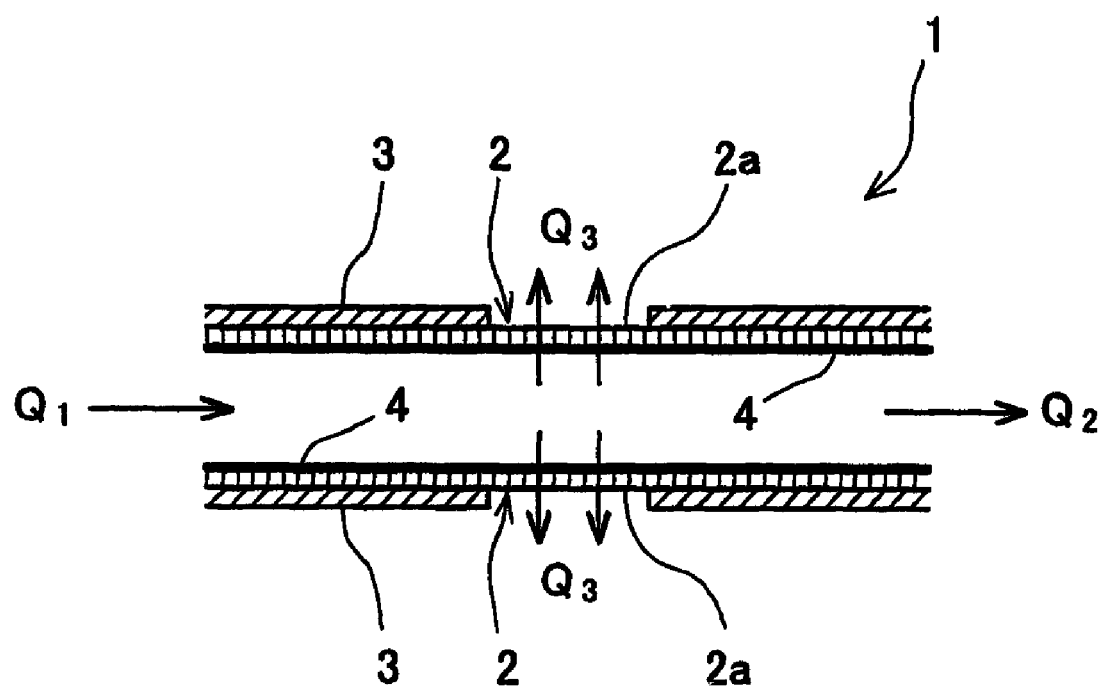
FIG. 1 is a cross-sectional view schematically illustrating the structure of a tubular gas separation module constructed with a representative zeolite membrane.

In one embodiment of the present teachings, apparatus are taught that may comprise a reactor housing having a gas feed inlet and a gas discharge port. For example, a mixed hydrogen gas source may be input into the gas feed inlet. Preferably, the reactor housing is substantially air tight with the exception of the gas feed inlet and the gas discharge port.

A substantially defect-free zeolite membrane is preferably disposed between the gas feed inlet from the gas discharge port. Thus, the zeolite membrane may substantially separate the reactor housing into a first half and a second half. The zeolite membrane preferably includes gas-permeable fine pores, which pores are substantially less permeable to carbon monoxide than to hydrogen. For example, the gas-permeable fine pores may have a higher retention time for polar gases, such as carbon monoxide, than non-polar gases, such as hydrogen.

The zeolite membrane also preferably comprises at least one metal that acts as an oxidation catalyst, which oxidation catalyst may be supported on the porous zeolite membrane. In a preferred use of such apparatus, a mixture of hydrogen and carbon monoxide may be supplied to the gas feed inlet and forced to permeate through the substantially defect-free zeolite membrane. As a result, the carbon monoxide is selectively oxidized without significant oxidation of the hydrogen. For example, the present apparatus may be utilized to prepare a source of hydrogen gas than is substantially free of carbon monoxide, e.g. the carbon monoxide concentration is less than about 50 ppm and more preferably, less than 10 ppm.

The present apparatus can be modified or constructed in a variety of ways. For example, the zeolite membrane may be supported on an inorganic porous support, such as for example alumina or other similar porous ceramic support. Moreover, the average pore diameter of the gas-permeable fine pores is preferably between about 0.3 nm and about 1.0 nm. Moreover, the substantially defect-free zeolite membrane may have a thickness of between about 0.1 micron and about 50.0 microns. In particularly preferred embodiments, the zeolite membrane comprises a Y-type zeolite.

Methods of making a zeolite membrane are also taught herein. For example, a porous ceramic support surface may be contacted or rubbed with zeolite particles. The zeolite particles may be, e.g. X-type zeolite particles. After rubbing the zeolite particle on the ceramic support surface, the porous ceramic support surface may be contacted with a solution of zeolite starting materials, which may preferably include a source of silicon and a source of aluminum. Thereafter, the porous ceramic support surface and the zeolite starting materials may be heated and pressurized in order to form a zeolite membrane on the porous support. Preferably, the zeolite membrane is substantially defect-free and forms a continuous layer on the porous support. Further, at least one oxidation catalyst may be introducing (and/or impregnated) into the zeolite membrane. For example, the oxidation catalyst may be at least one metal that is capable of oxidizing target molecules and more preferably may be a noble transition metal.

Further, methods for selectively oxidizing carbon monoxide in a source of gas containing carbon monoxide and hydrogen are also taught. For example, such methods may include feeding a gas containing carbon monoxide and hydrogen into a membrane reactor capable of selectively absorbing the carbon monoxide. That is, the membrane reactor preferably has a longer retention time for carbon monoxide than hydrogen. In particularly preferred embodiments, the retention time for carbon monoxide is at least about 8-10 times longer than for hydrogen. In other preferred embodiments, the reactor preferably includes a substantially defect-free zeolite membrane and the gas containing carbon monoxide and hydrogen is forcibly passed or permeated through the zeolite membrane. More preferably, the zeolite membrane includes at least one oxidation catalyst that is capable of selectively catalyzing the oxidation of carbon dioxide in the presence of hydrogen. The oxidation catalyst may be, e.g. at one metal that acts as an oxidation catalyst supported on an inorganic porous support, which at least one metal selectively oxidizing the carbon monoxide. More preferably, the oxidation catalyst is a noble transition metal, such as platinum.

These methods may be modified in various ways. For example, the gas containing carbon monoxide and hydrogen gas may be forced through the zeolite membrane at a temperature of about 200-300° C. In certain circumstances, the selective oxidation of carbon dioxide by the oxidation catalyst is facilitated at higher temperatures. However, oxidation catalysts that selectively oxidize carbon monoxide at higher or lower temperatures also may be utilized with the present teachings.

The zeolite membrane is preferably supported on a porous ceramic support, such as alumina, although other porous supports, such as porous metal supports may be utilized. It is preferably that the porous support imparts mechanical strength to the zeolite membrane, thereby making the zeolite membrane more durable, without reducing the gas flux rate through the zeolite membrane. Thus, the porous support may, for example, have pore sizes that are larger, and preferably much larger, than the gas-permeable fine pores of the zeolite membrane. In addition or in the alternative, the porous support preferably does not substantially absorb the gas components, although this feature is optional.

The zeolite membrane preferably has an average pore diameter of between about 0.3 nm and about 1.0 nm and Y-type zeolites may preferably utilized as the source of zeolite material for the zeolite membrane. Moreover, the zeolite membrane is preferably continuous and substantially defect-free and the defect-free portion of the zeolite membrane preferably has a thickness of between about 0.1 micron and about 50.0 microns.

Preferably, porous membranes are utilized that provide relatively high heat resistance and maintain suitable and stable gas separation capacity and oxidation catalyst capacity in temperature ranges that are commonly utilized in the preparation and use of mixed hydrogen gas sources. For example, the present porous membranes are preferably reliable and stable in a temperature range of about 150° C.~300° C. and more typically about 200° C.~300° C. Accordingly, inorganic porous membranes are preferred, such as porous membranes comprising silica, silica-zirconia, or silicon nitride. More preferably, such inorganic porous membranes include gas-permeable fine pores and zeolite membranes are particularly appropriate materials. Various synthetic zeolites can be utilized to prepare the present zeolite membranes, including but not limited to Y-type zeolites, X-type zeolites, A-type zeolites, mordenite, ZSM-5, silicalite and other zeolite materials.

Such zeolite membranes and apparatus for selectively oxidizing carbon monoxide in a mixture of hydrogen gas can be utilized to prepare hydrogen gas sources, which are substantially free of carbon monoxide. One use of such hydrogen gas sources is fuel cells. Various fuel cell systems have been proposed and the present teachings are highly useful to provide the hydrogen gas source that is necessary to operate such fuel cells. In fact, the present teachings can be utilized for a variety for fuel cell designs, such as fuel cell designs for electrically powered automobiles, electrically-powered household appliances and any other electrically-powered devices that can be powered by a fuel cell, which operates on hydrogen gas.

Preferred zeolite membranes may be prepared as a single-layer structure, which consists of only one-type of zeolite material, or a multi-layer structure comprising two or more different zeolite materials. If the zeolite membrane will be utilized to selectively oxidize carbon monoxide in a mixed hydrogen gas source, a Y-type zeolite or mordenite zeolite are particularly preferred. The average pore size is preferably between about 0.3 nm to 0.9 nm and more preferably between about 0.7 nm to 0.8 nm. Therefore, such fine pores will not restrict the permeation of non-polar molecules having a relatively small size, e.g., hydrogen (which has a kinetic molecular diameter of about 0.29 nm). However, such zeolite membranes can restrict permeation by larger polar molecules and also such zeolite membranes can selectively absorb smaller polar molecules, e.g. carbon monoxide (which has a kinetic molecular diameter of about 0.38 nm).

Y-type zeolite materials are particularly preferred, because Y-type zeolites have a crystal structure that is identical to "faujasite," which is a natural zeolite. Thus, Y-type zeolites provide a crystal structure in which the pore diameter opening consists of a 12-membered ring structure of oxygen. The average pore diameter is about 0.74 nm and the supercage is about 1.3 nm. Consequently, the pores of a Y-type zeolite provide sufficient clearance for carbon monoxide, which is to be oxidized and removed, and oxygen molecules (kinetic molecule diameter of about 0.35 nm).

Various materials can be utilized as the oxidation catalyst. In one embodiment of the present teachings, the oxidation catalyst must be capable of catalyzing the oxidation of one or more harmful components in a mixed hydrogen gas source. For example, the oxidation catalyst must be capable of catalyzing the oxidation of carbon monoxide in the presence of oxygen and more preferably in the presence of excess oxygen. For example, various metals are known to act as oxidation catalysts and one or more such metals may be incorporated into the zeolite membrane. In particular, various noble metals, such as platinum (Pt), palladium (Pd), ruthenium (Ru), gold (Au), rhodium (Rh), and iridium (Ir), or alloys thereof may be utilized to catalyze the oxidation of carbon monoxide. However, oxidation catalysts of the present teachings are not limited to such noble metals. In fact, any oxidation catalyst can be utilized that is capable of selectively oxidizing carbon monoxide when disposed in a zeolite membrane of the present teachings.

Various methods can be utilized to prepare appropriate zeolite membranes, and instructive methods have been employed in the manufacture of known gas separation membranes. For example, appropriate zeolite membrane can be manufactured using a hydrothermal synthesis of various materials. In one preferred method, a zeolite membrane can be formed on the surface of a porous ceramic support. Supports of various shapes can be utilized, such as tubular, plate-like, and monolithic shape and various support materials may be utilized, such as alpha-alumina.

For example, the porous ceramic support may be placed in a solution containing an alkali source, an alumina source, and a silica source serving as zeolite source materials and heat treated, for example, for 5 to 100 hours at a temperature of 80~200° C. In preferred methods, the temperature is increased at a rate of equal to or less than about 1° C. per minute and then the resulting zeolite membrane and porous ceramic support are cooled at a rate of equal to or less than about 1° C. per minute. As a result, a continuous zeolite polycrystalline membrane without defects will reliably form on the support surface and/or inside the pores of the porous ceramic support.

Various starting materials can be utilized without particular restriction. For example, the alkali source may be hydroxides or various salts of alkali metals or alkaline earth metals. The alumina source may be, e.g., aluminum chloride, aluminum nitrate, aluminum sulfate or another similar material. The silica source may be, e.g., a colloidal silica, sodium silicate or other similar silica source.

A defect-free polycrystalline zeolite membrane can be formed using such techniques and such defect-free polycrystalline zeolite membranes are highly resistant to the formation of pinholes or crystal gaps. Thus, a zeolite membrane can be continuously formed on the porous ceramic support surface. Naturally, the porous ceramic support preferably has pores that are larger than the fine pores in the zeolite membrane. That is, the porous ceramic support preferably may be used merely to mechanically support the zeolite membrane and it is preferred that the porous ceramic support does not degrade the gas permeation characteristics of the zeolite membrane. For example, various porous ceramic supports are known (e.g. alumina) that have sub-micron sized pores (e.g., 0.1-1.0 microns) or pores on the order of several microns (e.g., 1-10 microns). As a result, such porous ceramic supports can be advantageously utilized to mechanically support the present zeolite membranes.

In one preferred method, the formation of zeolite membrane is promoted by rubbing zeolite particles into the porous support surface (e.g. the outer surface and inner wall surface of pores) prior to performing the hydrothermal reaction. Zeolite particles are generally more brittle than the porous ceramic support, such as an alumina. Thus, fine zeolite particles produced by grinding during such rubbing can be forced to adhere to a wide area of the ceramic support surface. By rubbing these fine zeolite particles into the ceramic support, it is believed that nucleation sites are formed for the later crystallization of the zeolite membrane. However, other techniques for forming crystallization nucleation sites and for promoting the formation of the zeolite membrane may naturally be utilized with the present teachings. Preferably, X-type zeolite particles are rubbed into the porous support surface before the hydrothermal reaction.

After forming the polycrystalline zeolite membrane on the porous ceramic support, the oxidation catalyst may be introduced into the zeolite membrane. Naturally, the oxidation catalyst can be introduced at any time, and in fact can be incorporated into the zeolite membrane when the zeolite membrane is crystallizing on the porous ceramic support. Various techniques for incorporating the oxidation catalyst into the zeolite membrane may be utilized.

In one embodiment of the present teachings, the oxidation catalyst is a metal having the desired oxidation catalyst capacity. No specific limitation is placed on the method for incorporating the metal into the zeolite membrane. For example, if the zeolite membrane is an alkali metal ion substitution type, such as a NaY-type zeolite, the desired metal catalyst can be impregnated into the zeolite membrane by an ion exchange method using a noble metal salt such as a platinum salt.

In one representative method, the zeolite membrane is placed in an aqueous solution of a platinum amine salt (for example, $[Pt(NH_3)_4]Cl_2$) and subjected to heating and shaking (typically, for no less than 2 hours at a temperature of 70-80° C.). The platinum complex is introduced into the Y-type zeolite via an ion exchange with sodium ions. Thereafter, a platinum Y-type zeolite membrane (hereinafter, a "PtY-type zeolite membrane") can be produced by firing (i.e. calcinating), typically in air, in an electric furnace and reducing the platinum, e.g., in a stream of hydrogen gas. Although the preferred firing temperature is about 200~600° C. (more preferably 200~300° C.) and the preferred heating time is about 3 hours, these conditions are not limiting.

In another aspect of the present teachings, zeolite membranes preferably exhibit the properties of being a selective gas permeation membrane (gas separation membrane) and having a selective oxidation catalyzing capacity. Therefore, it is preferable that target molecules within a mixed gas substance can be oxidized and separated (or removed) in order to prepare substances that are substantially free of the target molecule. As a result, various applications of the present zeolite membranes are possible. For example, in one possible application, the present zeolite membranes can be utilized as gas separation membranes for separation and purification of a target gas component (for example, separation membrane for hydrogen gas purification). Another possible utilization is a membrane for selective oxidation and removal of volatile organic compounds, carbon monoxide or other oxides, including $NO_x$ species. Examples of other applications include membrane air cleaners for removal of harmful oxidizable gas molecules present in indoor air or membrane-like NO$_x$ removing materials for removal of harmful NO$_x$ from exhaust gases of automobiles or other internal combustion engines.

The present zeolite membranes can be disposed within reaction modules that are incorporated into containers or other types of apparatus. For example, as noted above, the zeolite membrane can be used to remove carbon monoxide from a reformed gas for fuel cells (e.g. a mixed hydrogen gas source) and purification of hydrogen gas. In this case, the zeolite membrane may be formed as a coating on the surface of a plate-like porous support or inner wall surface of a tubular porous support. The combination of the zeolite membrane coated on the porous support may be utilized as a gas separation module. A plurality of such gas separation modules may be separately constructed and utilized in parallel in order to provide a relatively high flux rate for the hydrogen gas. For example, a carbon monoxide removal apparatus incorporating one or more such modules can be installed in a hydrogen gas feed line of a fuel cell (that is, between a reformer and the fuel cell module). Therefore, a carbon monoxide removal apparatus (and a membrane reaction module used therein) for a compact fuel cell system can be prepared, which can efficiently remove carbon monoxide from the mixed hydrogen gas source with a relatively high gas flux rate.

In addition or in the alternative, the present zeolite membranes and membrane reactors can be utilized in modules for the oxidation of unburned hydrocarbons (paraffins, olefins, aldehydes and aromatic compounds) and/or separation and removal of oxidation products. Thus, membrane reactors can be prepared to treat exhaust gases. Moreover, membrane reactor module can be prepared for exhaust gas treatment and the membrane reactor modules may incorporate such membrane reactors. Of course, exhaust gas treatment apparatus may incorporate such modules.

Further, as noted above, the oxidation catalyst is preferably incorporated into the zeolite membrane. Because the zeolite membrane can more efficiently and selectively oxidize the target molecule, the amount of oxidation catalyst (e.g. a noble metal) can be greatly reduced in comparison with known reactors (bed reactors), such as bed reactors that are filled with an oxidation catalyst (platinum or other noble metal). Therefore, the present teachings provide purification modules and apparatus that provide superior performance with lower material costs.

Each of the additional features and method steps disclosed above and below may be utilized separately or in conjunction with other features and method steps to provide improved zeolite membranes and methods for making and using the same. Detailed representative examples of the present teachings, which examples will be described below, utilize many of these additional features and method steps in conjunction. However, this detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the present teachings in the broadest sense, and are instead taught merely to particularly describe representative and preferred embodiments of the present teachings, which will be explained below in further detail with reference to the figures. Of course, features and steps described in this specification may be combined in ways that are not specifically enumerated in order to obtain other usual and novel embodiments of the present teachings and the present inventors contemplate such additional combinations.

1. Fabrication of Platinum-impregnated Y-type Zeolite Membrane and Tubular Gas Separation Module A porous alpha-alumina tube (tube length=200 mm, inner diameter=1.7 mm, outer diameter=2.1 mm, void capacity=0.40, pore size=120~150 nm) was used as a zeolite membrane support (hereinafter "support tube 2"). A representative tubular gas separation module 1 was fabricated as shown in FIG. 1. Specifically, the outer surface of the support tube 2 was sealed with a glass sealing agent (Nippon Electric Glass Corp., #GA-4), with the exception of a central portion 2a (13 mm) in the longitudinal direction thereof, and a glass-sealed portion 3 was formed. That is, the glass-sealed portion 3 was made impermeable to gases so that the gas-permeable area of the support tube 2 was limited the central portion 2a. In this example, the gas-permeable surface area of the central portion 2a was $7.2 \times 10^{-5}$ m$^2$.

The starting material solution for zeolite membrane synthesis was prepared in the following manner. A sodium silicate solution, sodium aluminate, sodium hydroxide, and de-ionized water were mixed and further stirred for 12 hours at room temperature. For example, $Al_2O_3:SiO_2:Na_2O:H_2O$ was utilized in a molar ratio of 1:12.8:17:975 in order to prepare the starting material solution.

In order to promote nucleation, NaX-type zeolite particles (particle size=2 microns; ratio of Si:Al=1.25) were rubbed into the inner wall surface of support tube 2. Specifically, a thread impregnated with zeolite particles was rubbed against the inside of the support tube 2 and moved back and forth. A layer of polytetrafluorocarbon tape (trade name Teflon) was also placed around the outer surface of glass-sealed portion 3 in order to further suppress the permeation of gases from portions of the support tube 2, other than the central portion 2a.

After rubbing NaX-type zeolite particles on the support tube 2, the support tube 2 was placed in the zeolite starting material solution and autoclaved for 24 hours at a temperature of 90° C. in an oil bath. In the resulting hydrothermal reaction, the autoclave was shaken at 2 hour intervals to ensure that the starting material solution was sufficiently circulated around the entire interior portion of support tube 2. As a result, a NaY-type zeolite membrane 4 was formed inside the support tube 2, as shown schematically in FIG. 1. After completion of the membrane formation step, the support tube 2 and the NaY-type zeolite membrane 4 were washed with de-ionized water and then dried for 12 hours at a temperature of 35° C.

In order to introduce an oxidation catalyst into the NaY-type zeolite membrane 4, the support tube 2 was placed in a $[Pt(NH_3)_4]Cl_2$ aqueous solution having a concentration of 2.5 mmol/L for 4 hours at a temperature of 80° C. As a result, an ion-exchange reaction was performed, in which some of the sodium ions in the zeolite membrane were exchanged for platinum ions. After sufficient platinum ions are introduced into the zeolite membrane 4, the support tube 2 and the ion-exchanged zeolite membrane 4 was washed with de-ionized water and then air dried for 12 hours at a temperature of 35° C. Thereafter, the support tube 2 and the ion-exchanged zeolite membrane 4 was then placed in an electric furnace and fired for 3 hours at a temperature of 250° C. The platinum ions introduced into the ion-exchanged zeolite membrane 4 were then reduced in a stream of hydrogen gas for 3 hours at a temperature of 250° C. in order to produce a PtY-type zeolite membrane 4.

Figure 2:
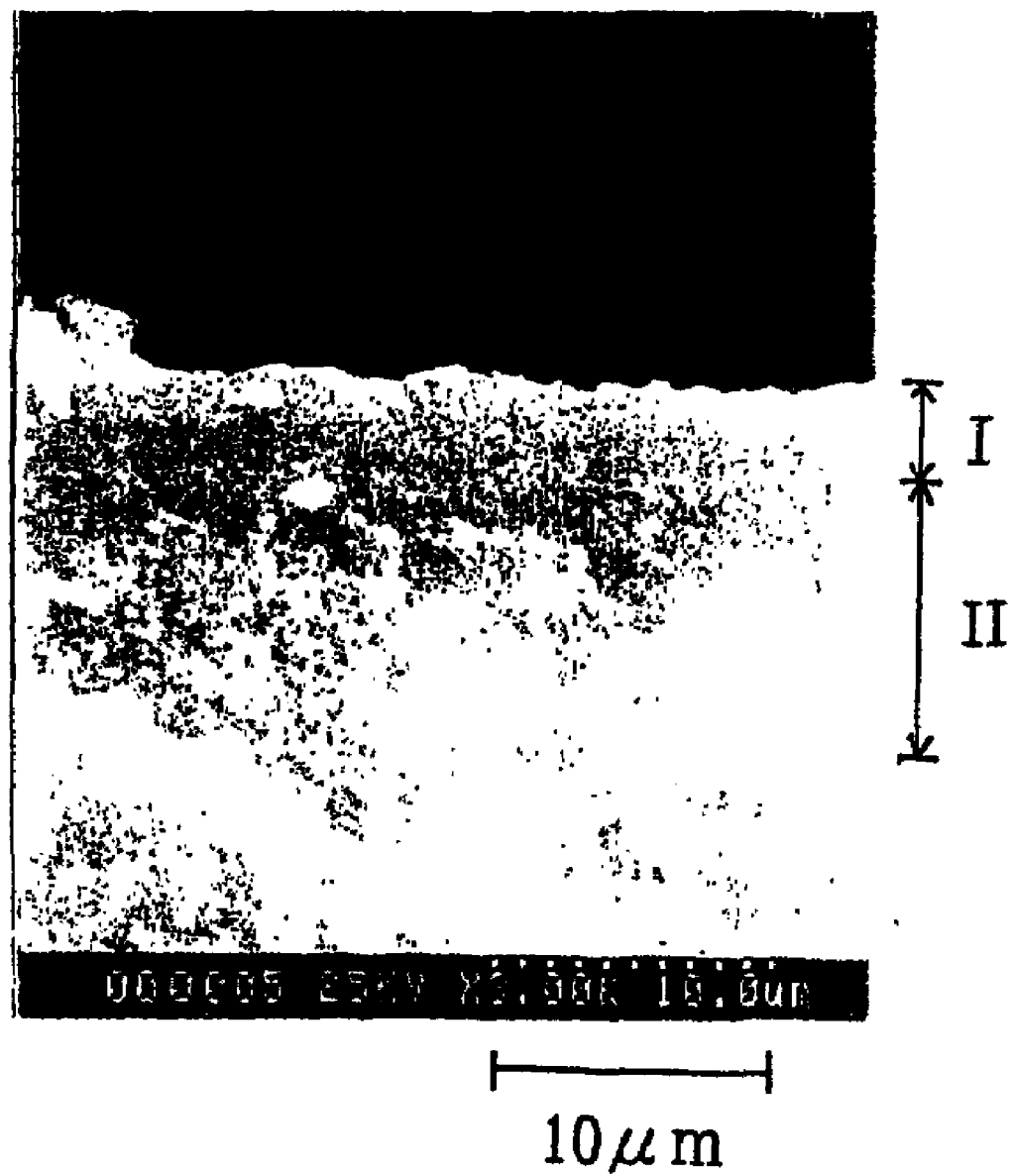
FIG. 2 is an electron microscopic image showing the cross section of a representative PtY-type zeolite membrane that is disposed on the inner surface of a porous support tube.

FIG. 2 shows an electron microscope image of the resulting PtY-type zeolite membrane 4 prepared according to the present example. In particular, it is noted that two zones are formed as viewed in cross section. As identified in FIG. 2, zone I indicates a zeolite membrane formed on the inner wall surface of porous support tube 2 and zone II indicates a zeolite membrane formed in the voids of the support tube 2. Zone I has a thickness of 3-5 microns and contained cracks and defects. However, zone II has a thickness of about 10 microns and does not include cracks. Thus, zone II provides a substantially defect-free zeolite membrane according to the present teachings. For purposes of reference, it is noted that the white particles observed in FIG. 2 are the fired alpha-alumina particles of support tube 2.

Thus, a tubular gas separation module 1 can be formed to include a substantially defect-free layer of a zeolite membrane 4 disposed on a porous ceramic support 2. The zeolite membrane 4 also preferable includes an oxidation catalyst, which in this example is platinum.

2. Fabrication of an Apparatus for Selective Oxidation of Carbon Monoxide

Figure 3:
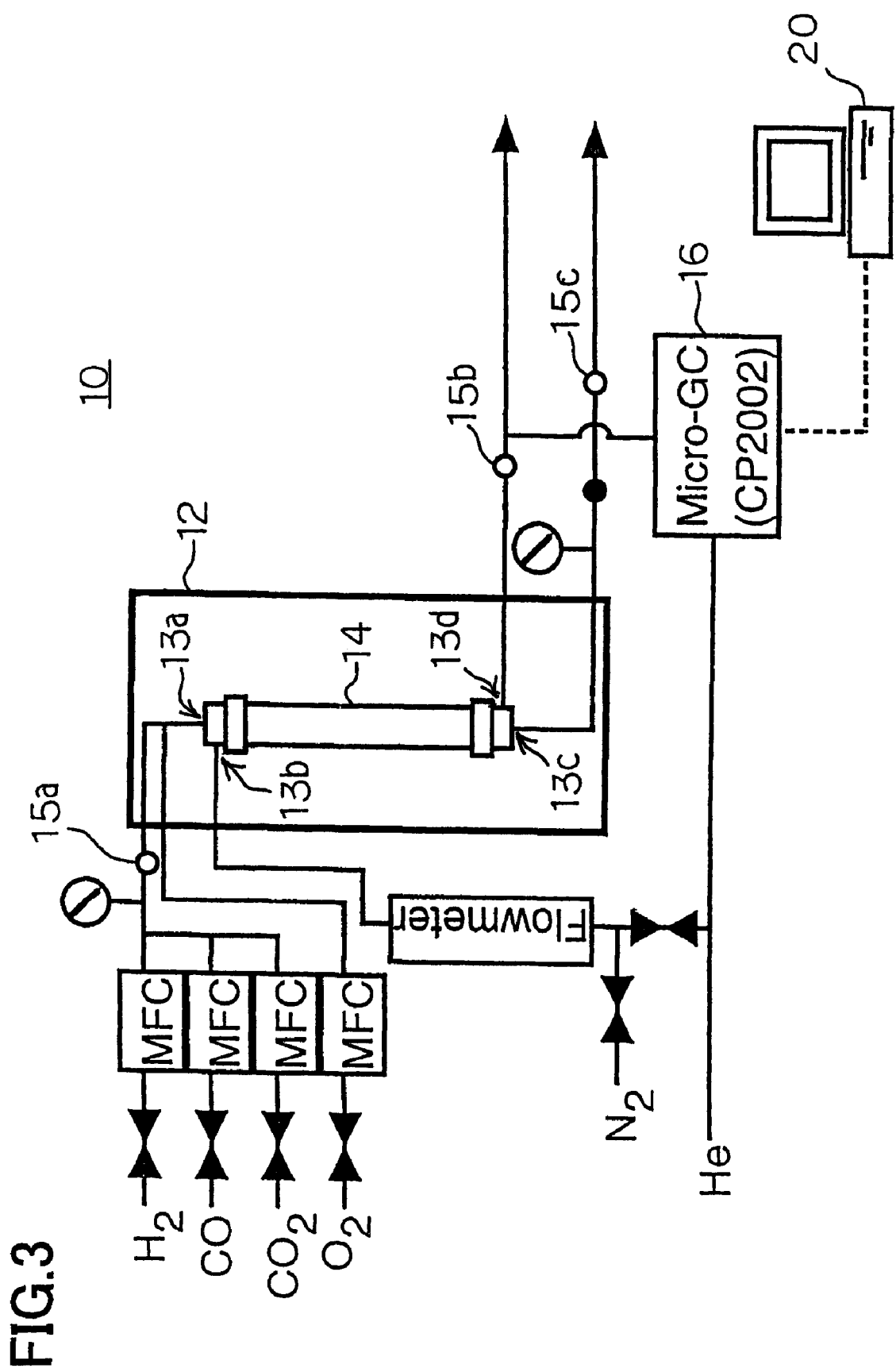
FIG. 3 is a block diagram schematically illustrating a carbon monoxide removal apparatus constructed by using representative zeolite membranes.

The tubular gas separation module 1, as prepared in the above example, was incorporated into the apparatus 10 shown in FIG. 3. More specifically, the tubular gas separation module 1 was incorporated into a permeation tube 14, which was disposed in a temperature-controllable enclosure 12. That is, the environment within enclosure 12 can be adjusted to any desired temperature in order to test the influence of temperature on the selective oxidation of carbon monoxide in a mixed hydrogen gas source.

Figure 4:
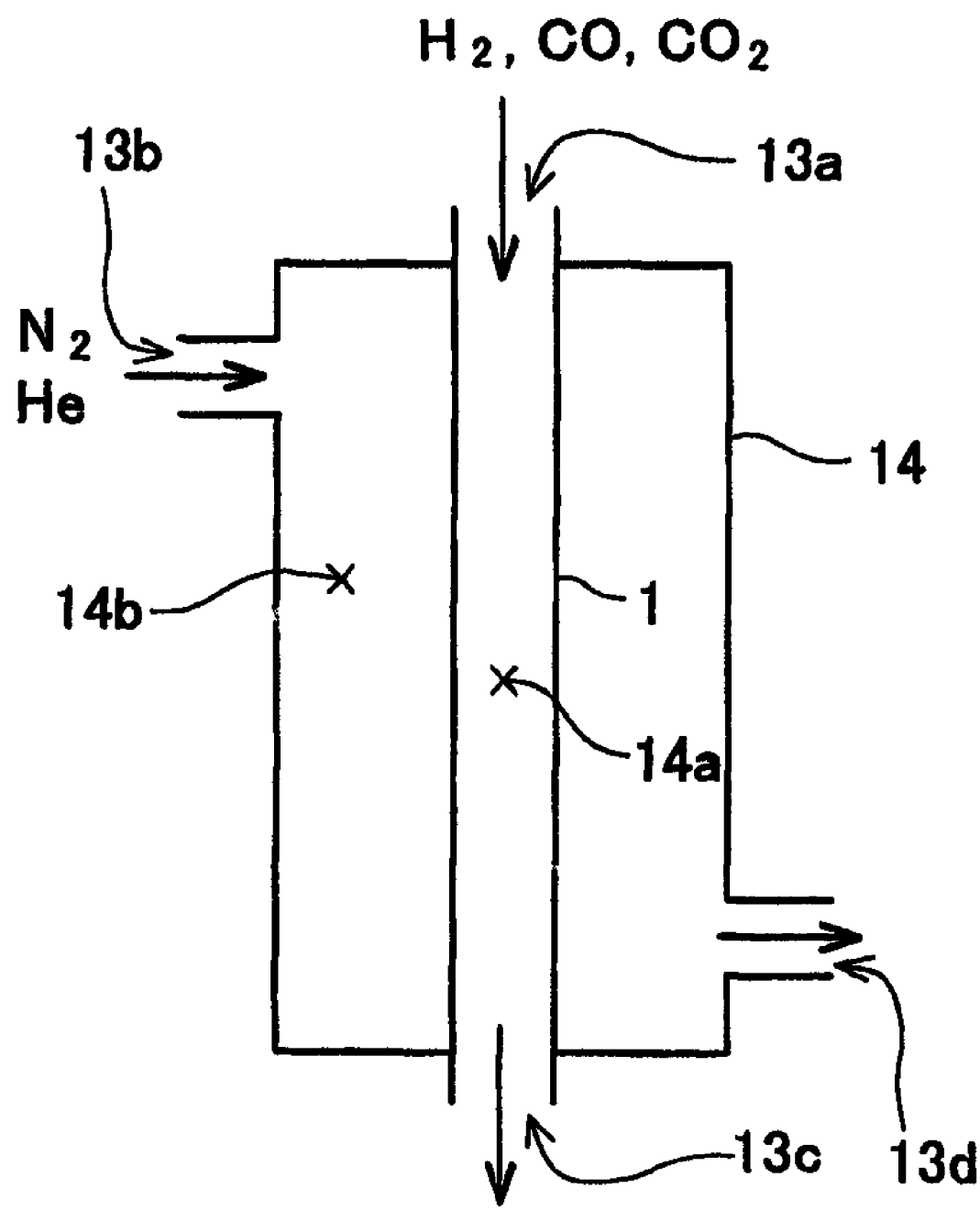
FIG. 4 is a schematic drawing explaining the internal structure of a permeation tube installed in the carbon monoxide removal apparatus of FIG. 3.

FIG. 4 shows the tubular gas separation module 1 disposed inside the permeation tube 14 in further detail. In particular, the permeation tube 14 includes a double-tube structure consisting of an inner tube 14a, which is equivalent to the inner portion of support tube 2 of the tubular gas separation module 1, and an outer tube 14b, which is equivalent to the outer side of module 1. As described above, the central portion 2a of support tube 2 of tubular gas separation module 1 was not sealed, as shown in FIG. 1. Therefore, gas was fed into the interior of the inner tube 14a (inner portion of support tube 2) and a portion of the gas permeates through the fine pores of PtY-type zeolite membrane 4 and support tube 2. Any gas that permeates into the outer tube 14b can be identified and measured. For purpose of later reference, inner tube 14a will be referred to as the gas feed side of the zeolite membrane 4 and outer tube 14b will be referred to as the gas permeation side of the zeolite membrane 4.

As shown in FIG. 3 and FIG. 4, two gas feed openings (first gas feed opening (a) and second gas feed opening (b)) and two gas discharge openings (first gas discharge opening (c) and second gas discharge opening (d)) are provided in the permeation tube 14. Thus, the inner tube 14a of permeation tube 14 directly couples the first gas feed opening 13a to the first gas discharge opening 13c. On the other hand, the outer tube 14b of permeation tube 14 couples the second gas feed opening 13b to the second gas discharge opening 13d. Therefore, gas can be supplied or fed into apparatus 10 independently from an external gas feed source to the inner tube 14a (via first gas feed opening 13a) and to the outer tube 14b (via second gas feed opening 13b).

As a result of the design shown in FIG. 4, gas discharged from the inner tube 14a at first gas discharge opening 13c can be recovered separately from the gas discharged from the outer tube 14b at second gas discharge opening 13d. As shown in FIG. 3, sampling points 15a, 15b, 15c are provided at the gas feed side and gas discharge side and the gas flowing therein can be directly sampled. In addition, a gas chromatograph (Micro-GC) was installed in the gas discharge channel of outer tube 14b. Thus, the concentration of gas flowing therein was measured and the measured data was analyzed in a computer system 20.

3. Evaluation of Defect-Free Zeolite Membrane

In order to confirm that the zeolite membrane 4 was substantially defect-free, the gas permeation capacity of the NaY-type zeolite membrane formed on the inner wall surface of alpha-alumina tube 2 was determined before the introduction of the oxidation catalyst. That is, the NaY-type zeolite membrane 4 was formed on tube 2 and, prior to introducing Pt, the tube was utilized in the above-described tubular gas separation module 1 of apparatus 10. At a temperature of 35° C., a single-component hydrogen gas and an equimolar mixture of carbon dioxide and nitrogen as a feed gas were alternatively introduced into tube 2. Thus, the feed gas was introduced inside (inner tube 14a) of the support tube 2. Helium was used as a sweep gas and was supplied to the outside (outer tube 14b) of the support tube. The flow rate at the permeation side (that is, at the discharge side of outer tube 14b) was measured using a soap-film flowmeter (not shown). Gas analysis was conduced using a gas chromatograph (TCD-GC: Shimadzu, GC-8A) having a TCD detector. During these evaluation tests, the total pressure was maintained at 101.3 kPa (about 0.1 MPa) on both sides. Gas permeability was calculated using the following equation:

Permeance=(number of moles of gas that passed though central portion 2a per unit time)/(surface area of central portion 2a)×(differential partial pressure)

Permeation selectivity was determined from the permeation ratio. Based upon the results of these tests with the NaY-type zeolite membrane at a temperature of 35° C., the permeance of carbon dioxide was $1.4 \times 10^{-6}$ mol·m$^{-2}$·Pa$^{-1}$·s$^{-1}$ and the permeance of nitrogen was $4.7 \times 10^{-8}$ mol·m$^{-1}$·Pa$^{-1}$·s$^{-1}$. Thus, carbon dioxide has a permeation selectivity through the NaY-type zeolite membrane that is 30 times greater than nitrogen. When several single-component gases (all of them having a molecule size smaller than the pore size of the zeolite membrane) were supplied, the NaY-type zeolite membrane demonstrated no significant permselectivity between those feed gases. These results conform to results of prior research on zeolite membranes and are consistent with the high selectivity of carbon dioxide to nitrogen in known defect-free zeolite membranes. Thus, these results indicate that no large defects were present in the zeolite membrane. Such selective permeation is apparently performed by the defect-free zeolite layer formed by zone I and zone II shown in FIG. 2.

4. Evaluation of Selective Oxidation of Carbon Monoxide Using PtY-type Zeolite Membrane The capacity of the PtY-type zeolite membrane to selectively oxidize carbon monoxide was evaluated by using the apparatus 10 that was described above. That is, platinum was impregnated into the zeolite membrane 4 and the tubular support 2 was disposed inside the enclosure 12, as described above in Example 1. Experiments were then performed to evaluate the characteristics of the PtY-type zeolite membrane 4.

First, a mixed hydrogen gas source was prepared by supplying hydrogen ($H_2$), carbon monoxide (CO), and carbon dioxide ($CO_2$) from an outside gas feed source at respective flow rates of 49.5, 0.50, and 0.62 mL/min. These three gases were mixed at a stage prior to introduction into the first gas feed opening 13a. Further, oxygen ($O_2$) was separately supplied from an external gas feed source into the first gas feed opening 13a at variable flow rates of 0 to 0.6 mL/min. The resulting mixed hydrogen gas sources were supplied to the inner tube 14a (i.e., inside the tubular gas separation module 1) of permeation tube 14 (see FIG. 3). Nitrogen ($N_2$) or helium (He) were utilized as sweep gases and were supplied to the outer tube 14b at a flow rate of 40 mL/min.

In order to study the effect of temperature on gas permeability and selective oxidation of carbon monoxide in the evaluation tests, identical tests were conduced by varying the temperature within enclosure 12 between 150~250° C. range. FIGS. 5-9 respectively show the output of hydrogen, carbon monoxide and oxygen from second gas discharge port 13d (FIG. 4), which was coupled to gas sampling point 15b, when the tests were performed at the temperatures of 150, 175, 200, 225, and 250° C., respectively.

As noted above, a gas chromatograph (TCD-GC: Shimadzu, GC-8A) having a TCD detector was coupled to sampling point 15b and hydrogen concentration at the permeation side (discharge port 13d) was measured. The hydrogen gas supplied for the measurements was directly sampled from the sampling points 15b, 15c by using a syringe. The concentration of carbon monoxide and oxygen was measured by using a Micro-GC (Chrompack, CP2002). The detection limit of carbon monoxide in this measurement system was 8 ppm. The flow rate in the vicinity of the first gas discharge opening 13c (that is, the outlet opening at the feed side) and in the vicinity of the second gas discharge opening 13d (that is, the outlet opening at the permeation side) was measured by using a soap-film flowmeter.

In order to determine the effect, if any, of steam (water vapor) on the activity of the oxidation catalyst (platinum), de-ionized water vapor was introduced via a sampling point 15a, which was located close to the first gas feed opening 13a. The concentration of steam (water vapor) introduced into the first gas feed opening 13a was about 2%.

Based upon the above-described experimental test conditions, the relationship between the flux of hydrogen, carbon monoxide, and oxygen permeating through the PtY-type zeolite membrane at various temperature conditions between 150~250° C. and various oxygen flow rates (feed rates) was studied. The flow rate (mL/min) of supplied oxygen is plotted against the abscissa in the graphs shown in FIGS. 5-9. Further, the flux (mol/m$^2$·s) of each gas though the PtY-type zeolite membrane 4 is plotted against the ordinate in the graphs of FIGS. 5-9. The detection lower limit (i.e. 8 ppm) is shown by dotted lines in FIGS. 7-9. In addition, it is noted that the open circles represent the flux of hydrogen, the open triangles represent the flux of carbon monoxide, and the open squares represent the flux of oxygen. A solid, dark square represents the flux of oxygen when a mixture of oxygen and helium is fed. The shaded circles and triangles in FIG. 9 represent the flux of hydrogen and carbon monoxide, respectively, in the case when steam (water vapor) was admixed into the feed gas at sampling point 15a.

The results shown in FIGS. 5-9 clearly demonstrate that the flux of hydrogen and carbon monoxide does not depend on temperature when no oxygen is fed into the system (i.e. oxygen feed rate of 0 mL/min). Thus, it is assumed that a source of oxygen is necessary in order to selectively oxidize the carbon monoxide in the mixed hydrogen gas source. When no external oxygen is introduced, the flux of hydrogen and carbon monoxide was $(5.9~6.2)\times10^{-2}$ and $(6.4~8.4)\times10^{-5}$ mol·m$^2$·s$^{-1}$, respectively. These fluxes correspond to a permeability of hydrogen and carbon monoxide of $(6.3~6.5)\times10^{-7}$ and $(6.3~8.4)\times10^{-8}$ mol·m$^{-2}$·Pa$^{-1}$·s$^{-1}$, respectively. Thus, in the absence of an external oxygen source, the PtY-type zeolite has selective permeability for hydrogen that is about tenfold of the permeability of carbon monoxide. This result confirms the expectation that the zeolite membrane itself selectively absorbs polar gases (e.g. carbon monoxide) more than non-polar gases (e.g. hydrogen).

Although not wishing to be bound by theory, the difference in permeability of hydrogen and carbon monoxide is believed to be due to the relative molecule sizes (hydrogen 0.29 nm, carbon monoxide 0.38 nm). It is important to note that, even without the introduction of an external oxygen source, apparatus 10 decreases the concentration of carbon monoxide in the feed gas mixture from about 10$^4$ ppm (i.e., 10,200 ppm) to 1,000~1,500 ppm at the permeation side (discharge port 13d). Thus, the permeation inhibiting effect of the zeolite membrane 4 was confirmed, even if no external oxygen is provided. Specifically, the flux of carbon monoxide passing through the zeolite membrane was about ¹⁄₁₀₀₀th less than the flux of hydrogen. This result was determined based upon the facts that (1) the carbon monoxide permeability is ¹⁄₁₀th of the hydrogen permeability and (2) the carbon monoxide concentration is ¹⁄₁₀₀th of hydrogen in the mixed hydrogen gas system of this experiment. Furthermore, these results also demonstrate that hydrogen molecules can freely permeate through the fine pores of the zeolite membrane.

Based upon these results, the mean retention time of the gas components introduced into the PtY-type zeolite membrane of the present example can be calculated according to the following equation:

$$T_i = d_m X_i P_t / (N_i RT),$$

wherein $t_i$ is the retention time of gas component i, $d_m$ is the thickness of the defect-free membrane, $X_i$ is the average molar fraction of component i inside the fine pores, $P_t$ is the total pressure, $N_i$ is the flux of component i, R is the gas constant, and T is an absolute temperature.

The thickness of the defect-free zeolite membrane layer was assumed to be 3 microns based upon the electron micrograph shown in FIG. 2. Therefore, the retention time of hydrogen molecules in the defect-free zeolite membrane at temperatures between 150~250° C. is about 1.2-1.5 milliseconds. On the other hand, the retention time of carbon monoxide is about tenfold higher (12-15 milliseconds). Therefore, the retention time of hydrogen in the PtY-type zeolite membrane tested in this example was much lower than carbon monoxide. As a result, it is believed that hydrogen can quickly permeate through the zeolite layer without significant oxidation of the hydrogen. However, because carbon monoxide is absorbed and more readily retained by the zeolite membrane, there are greater opportunities to catalyze the oxidation of carbon monoxide. As a point of reference, it is noted that known bed reactors having an oxidation catalyst filler permeate hydrogen and carbon monoxide at the same speed. Thus, bed reactors are liable to result in significant oxidation of the desired hydrogen gas.

Next, the effects of the introduction of oxygen from the external source and changes in reaction temperature were accessed. Generally speaking, at lower temperatures, the introduction of external oxygen had only a small effect on carbon monoxide concentration levels in the gas that permeated through the zeolite membrane. However, at higher temperatures, carbon monoxide concentration levels in the gas that permeated through the zeolite membrane were quickly reduced to below detection levels (i.e. 8 ppm) by the introduction of external oxygen.

FIG. 5 shows the results when the enclosure 12 was maintained at a temperature of 150° C. while varying the amount of external oxygen admixed with the mixed hydrogen gas source described above (i.e., a mixture of hydrogen, carbon monoxide and carbon dioxide). As shown in FIG. 5, the oxygen flux through the zeolite membrane increased as the oxygen feed flow rate increased, thereby indicating that a substantial amount of externally added oxygen permeated the zeolite membrane without a reaction. A similar result was noted in FIG. 6, in which the enclosure was maintained at a temperature of at 175° C. Thus, these results indicate that the platinum catalyst was not particularly active at relatively lower temperatures. Furthermore, it is noted that the oxygen flux obtained when the mixture of oxygen and helium was fed to the feed side at an oxygen flow rate of 0.6 mL/min (STP) (as indicated by a solid, dark square in FIGS. 5-6) was almost equal to the oxygen flux in the above-mentioned feed system of hydrogen, carbon monoxide, and carbon dioxide.

However, when the temperature of enclosure 12 was increased to 200-250° C., the concentration of carbon monoxide in the gas permeating the zeolite membrane 4 significantly decreased with increases in the oxygen feed rate. These results are shown respectively in FIGS. 7-9. In fact, carbon monoxide could not be detected at an oxygen feed rate of 0.6 mL/min at temperatures of 200 and 225° C. and at an oxygen feed rate of 0.4 mL/min at a temperature of 250° C. Thus, carbon monoxide was reduced to below 8 ppm in each of these examples (at 8 ppm, carbon monoxide flux=$5.0 \times 10^{-7}$ $mol \cdot m^{-2} \cdot s^{-1}$). This result indicates that under such conditions carbon monoxide was substantially completely oxidized by the PtY-type zeolite membrane of the present example. Further, it is very important to note that the hydrogen flux in each of these examples remained remarkably unchanged, even when the amount of externally supplied oxygen was increased. Thus, the PtY-type zeolite membrane appears to have selectively oxidized the carbon monoxide without any significant oxidation of the desired hydrogen gas source.

As described above, FIG. 9 also shows a case in which steam (water vapor) was fed at a concentration of about 2% and a reaction temperature of 250° C. into apparatus 10. As shown by shade circles in FIG. 9, the hydrogen flux slightly increased in the presence of steam (hydrogen permeability decreased from $6.5 \times 10^{-7}$ to $5.4 \times 10^{-7}$ $mol \cdot m^{-2} \cdot Pa^{-1} \cdot s^{-1}$). However, the carbon monoxide flux demonstrated substantially no changes regardless of the presence of steam. Even in the presence of steam (water vapor at a concentration of 2%), the concentration of carbon monoxide became less than the detection limit when the flow rate of the supplied oxygen was raised to 0.4 mL/min (STP). Thus, it been demonstrated that the selective oxidation property of the present PtY-type zeolite membrane is not adversely affected (e.g. poisoned) by steam (water vapor) at a concentration that is consistent with typical mixed hydrogen gas sources produced by known methanol reformation methods. That is, such mixed hydrogen as sources are likely to include about at least about 2% water vapor, although various desiccating methods can be utilized to reduce the amount of water vapor in the mixed hydrogen gas source before supplying the mixed hydrogen gas source to the zeolite membrane.

Figure 10:
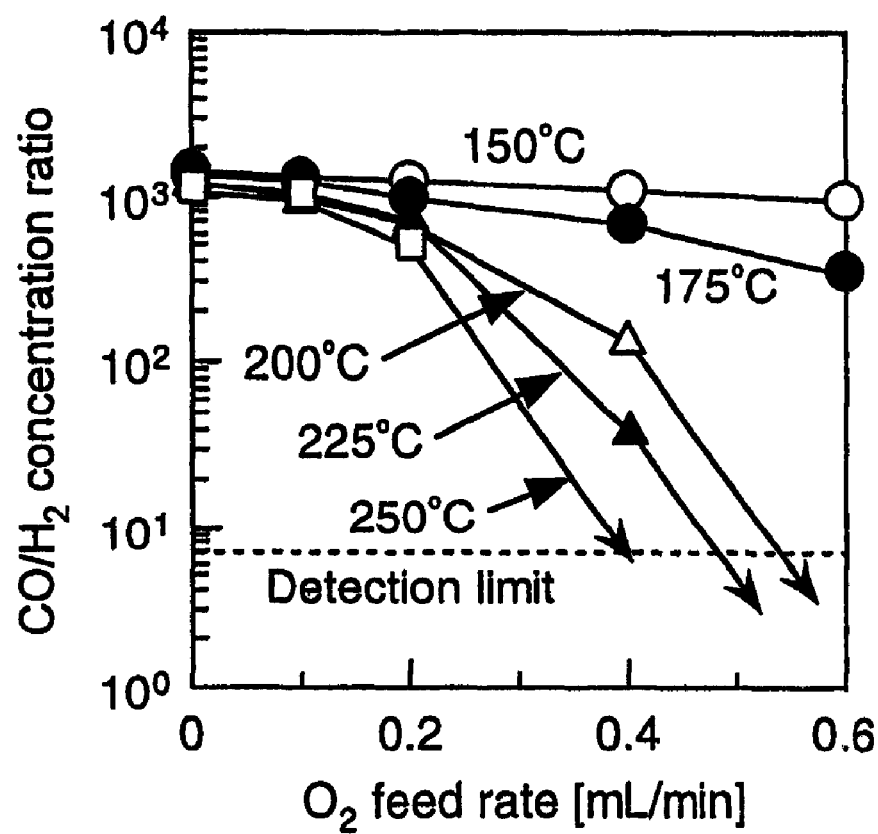
FIG. 10 is a graph illustrating the relationship between the carbon monoxide/hydrogen concentration ratio and oxygen feed flow rate through a PtY-type zeolite membrane at various temperatures.

FIG. 10 shows a summary of the respective carbon monoxide/hydrogen concentration ratios (taken at the permeation side) based upon the above-noted results. The oxygen feed flow rate (mL/min) is again plotted as the abscissa of this graph and the carbon monoxide/hydrogen concentration ratio ($CO/H_2$) is plotted as the ordinate. The dotted line again shows the lower detection limit (8 ppm) of the measurement system.

As shown more clearly in FIG. 10, the carbon monoxide/hydrogen concentration ratio generally decreased with increases of the reaction temperature and the oxygen feed ratio. These results establish the unexpected result that the PtY-type zeolite membrane of the present example can oxidize carbon monoxide with high selectivity and efficiency, even in the presence of an excess of hydrogen and an excess of oxygen. In particular, substantially no hydrogen appears to have been oxidized by the PtY-type zeolite membrane under any of the reaction condition, even under high-temperature conditions of more than 200° C. and an excess of oxygen. Therefore, highly selective oxidation of carbon monoxide can be performed even under high-temperature conditions.

As described above, a representative PtY-type zeolite membrane 4 and a carbon monoxide selective oxidation apparatus 10 was constructed and evaluated. The operation effects of the PtY-type zeolite membrane 4 and the carbon monoxide selective oxidation apparatus 10 will be described below.

When carbon monoxide is mixed with hydrogen at a concentration of about $10^4$ ppm, the flux of carbon monoxide passing through the PtY-type zeolite membrane is about $10^{-4}$ $mol \cdot m^{-2} \cdot s^{-1}$ if no oxygen is introduced to the feed side. This value is about $1/100^{th}$ of the hydrogen flux passing through the membrane. This permselective property derives from a combination of the following factors: (i) the membrane is hydrogen selective (typically, the hydrogen/carbon monoxide selectivity is more than 10) and (ii) the concentration of carbon monoxide at the feed side is low (about 1%). The carbon monoxide concentration at the permeation side is reduced to about $1/10^{th}$, because of the former factor and the carbon monoxide flux becomes about $1/100^{th}$ of the hydrogen flux because of the latter factor. As a result, carbon monoxide is selectively oxidized while the carbon monoxide permeates through the membrane. When the flow rate of oxygen is greater than carbon monoxide by a factor of 1.2, the carbon monoxide concentration at the permeation side decreases to below the detection limit (8 ppm) when reaction temperature exceeds 200° C. In addition, the presence of water vapor at a concentration of 2% does not change the activity of platinum-supporting Y-type zeolite membrane.

In previously described systems for reforming methanol into hydrogen and oxidizing the hydrogen in a fuel cell to generate electric power, the typical reforming temperature is 300° C. and the fuel cells are typically operated at 100° C. Therefore, it is advantageous that the present zeolite membranes, in particular PtY-type zeolite membrane 4, can selectively oxidize carbon monoxide in a temperature range of about 200-300° C. Therefore, the above-described PtY-type zeolite membrane 4 and carbon monoxide selective oxidation apparatus 10 can be effectively used for removing carbon monoxide from a reformed gas for fuel cells.

In the system constructed in the above-described example, the following fluxes were measured when hydrogen and carbon monoxide were respectively fed at the below-described fluxes ($Q_{1H2}$, $Q_{1CO}$) into the inner tube 14a under the conditions of an oxygen feed molar flow rate of $4.1 \times 10^{-7}$ mol/s and a reaction temperature of 250° C.

$Q_{1H2}$=$3.4 \times 10^{-5}$ mol/s
$Q_{1CO}$=$3.4 \times 10^{-7}$ mol/s
$Q_{2H2}$=$2.8 \times 10^{-5}$ mol/s
$Q_{2CO}$=$1.9 \times 10^{-9}$ mol/s
$Q_{3H2}$=$6.2 \times 10^{-6}$ mol/s
$Q_{3CO}$=below detection limit Those fluxes were fluxes ($Q_{2H2}$, $Q_{2CO}$) of hydrogen and carbon monoxide directly discharged from the inner tube 14a and fluxes ($Q_{3H2}$, $Q_{3CO}$) of hydrogen and carbon that permeated the PtY-type zeolite membrane from the inner tube 14a and were discharged from the outer tube 14b (that is, the permeation side) via the central portion 2a. The spatial relationship between those fluxes and the measurement positions is shown in FIG. 1.

Because the PtY-type zeolite was coated on the entire inner surface of the tube over a length of 0.15 m, oxidation of carbon monoxide and hydrogen is believed to have originated on this surface. The carbon monoxide concentration in the outlet opening (first gas discharge opening 13c) at the feed side of the support tube 2 under the aforesaid conditions was about 60 ppm, but the concentration in the outlet opening (second gas discharge opening 13d) at the permeation side was less than 8 ppm. Using the present conditions, the length of the PtY-type zeolite membrane in the longitudinal direction of permeable support tube was set at 13 mm (see Example 1) to minimize concentration changes at the feed side. As a result, only 18% of hydrogen was recovered at the permeation side.

Hydrogen permeability of Y-type zeolite membranes is relatively high (at an order of $10^{-6} mol \cdot m^{-2} \cdot Pa^{-1} \cdot s^{-1}$) compared to other inorganic membranes. Therefore, hydrogen recovery efficiency can be further increased by constructing a multi-tube module or single-sheet (monolithic) module of desired shape by using the Y-type zeolite membrane in accordance with the present teachings. Furthermore, hydrogen can be recovered more efficiency by applying an appropriate pressure (e.g. 0.1-0.5 MPa) to the feed side. Naturally, the gas reaction module can be optimized by further modeling or simulating the reaction conditions in view of other factors, such as module compactness, hydrogen cost, enthalpy balance, endurance of the PtY-type zeolite membrane in the presence of steam and other relevant conditions.

5. Representative Examples of Practical Uses for the Present Zeolite Membranes

The present zeolite membranes have a relatively high flux rate. As shown in the following Table 1, by applying a representative pressure of 0.1 MPa to the feed side, the experimental zeolite membranes are capable of passing (permeating) an amount of hydrogen that is capable of generating 1 kW (1000 J/s) of electric power per each 0.0819 m² of membrane surface area. Thus, the amount of surface area that is required to supply sufficient power for a representative set of uses of the present teachings (e.g. for automobile) is provided in the Table 1.

100 mm×100 mm×1 mm), which are disposed in parallel at about 1 mm intervals. In the tubular-type reactors 30, 32, 34, 36, 38, 40, 42, the zeolite membrane can be supported either inside or outside the support tube 31, 33, 35, 37, 39, 41, 43. In the plate-type reactor 60, the zeolite membrane 62 can be supported on either side of the support plates 61.

Figure 11:
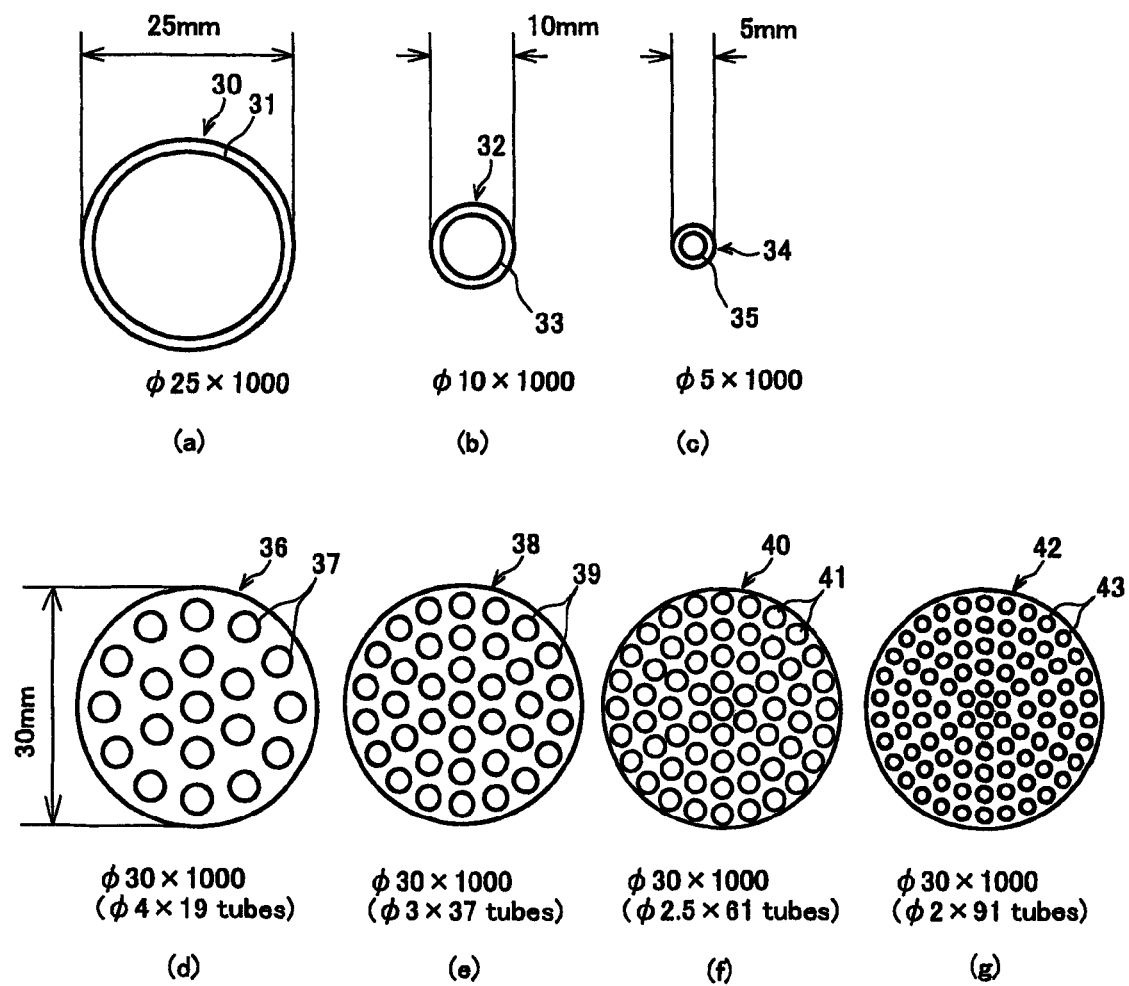
FIG. 11 shows several cross-sectional views that schematically illustrate representative tubular gas separation modules that may be constructed using the representative zeolite membranes, in which FIGS. 11(*a*)-(*c*) show single tubular type modules and FIGS. 11(*d*)-(*g*) show multi tubular type modules.

Table 2 shows the membrane surface area of each of the representative elements shown in FIGS. 11 and 13. Table 2 also shows the number of elements that would be required to generate 1 kW electric power from a source of gas containing hydrogen.

TABLE 2

| Type of Element (size: mm) | Membrane Area/Element (m²/1 element) | Number of Elements Required to Generate 1 kW |
|---|---|---|
| φ 25 × L1000 (1 tube) | 0.08 | 1 |
| φ 10 × L1000 (1 tube) | 0.03 | 2.7 |
| φ 5 × L1000 (1 tube) | 0.02 | 4 |
| φ 30 × L1000 (φ 4 × 19 tubes) | 0.24 | 0.4 |
| φ 30 × L1000 (φ 3 × 37 tubes) | 0.35 | 0.23 |
| φ 30 × L1000 (φ 2.5 × 61 tubes) | 0.42 | 0.20 |
| φ 30 × L1000 (φ 2 × 91 tubes) | 0.57 | 0.14 |
| 1000 × 1000 × 1 (1 plate) | 1 | 0.08 |

Figure 12:
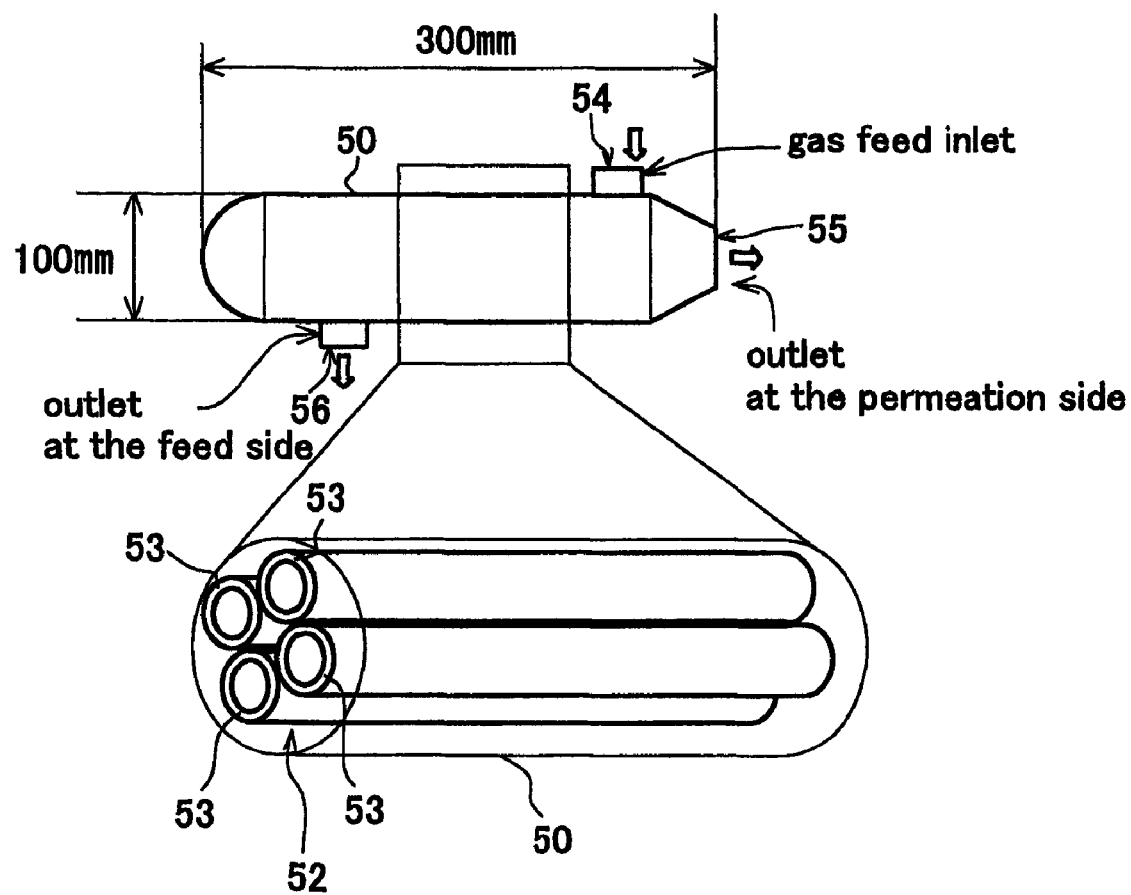
FIG. 12 is a schematic drawing that shows a representative carbon monoxide removal apparatus having four permeation tubes.

For example, if a single tubular element has a diameter of 25 mm and a length of 1000 mm, 0.08 m² of membrane surface area is provided. Alternatively, the same amount of membrane surface area can be provided by using, in parallel, 4 tubular elements each having a length of 250 mm. For example, as shown in FIG. 12, a cylindrical module 50 can be

TABLE 1

| Use | Power kW | Power Joule/s | Hydrogen Energy (per mole) kJ/mol | Energy Efficiency % | Required Hydrogen Supply Mol/s | Required H₂ Flux (0.1 MPa) Mol/s/m² | Required Membrane Surface Area m² |
|---|---|---|---|---|---|---|---|
| Automobile | 100 | 100000 | 237.3 | 83 | 0.51 | 0.062 | 8.19E+00 |
| Indoor | 1 | 1000 | 237.3 | 83 | 0.01 | 0.062 | 8.19E−02 |
| Outdoor | 0.2 | 200 | 237.3 | 83 | <0.01 | 0.062 | 1.64E−02 |
| Computer | 0.03 | 30 | 237.3 | 83 | <0.01 | 0.062 | 2.46E−03 |

FIG. 11 shows representative designs for reactor housings 30, 32, 34, 36, 38, 40, 42 that are capable, for example, of selectively oxidizing carbon monoxide in a mixed hydrogen gas source. Naturally, such designs can be utilized to oxidize other target oxidizable molecules and such designs are not limited to selectively oxidizing carbon monoxide in a mixed hydrogen gas source. For example, representative single tubular type reactors 30, 32, 34 are shown respectively in FIGS. 11(a), (b) and (c) and representative multi tubular type reactors 36, 38, 40, 42 are shown respectively in FIGS. 11(d), (e), (f) and (g). Alternatively, a representative multi-layer plate type reactor 60 is shown in FIG. 13 and also can be effectively utilized to generate electric power from a mixed hydrogen gas source. Reactor 60 may, for example, include eight support plates 61, each having a size of approximately constructed using such a multi-tubular type element 52 that includes four tubes 53 (φ25 mm×L250 mm). Naturally, each tube 53 preferably comprises a zeolite membrane having an oxidation catalyst, as described above. The gas, which preferably comprises hydrogen and a target oxidizable molecule, is feed into gas feed inlet 54 and the permeated gas is discharged at outlet 55. Gas that did not permeate the zeolite membrane may be discharged at outlet 56. This cylindrical module 50 has a highly compact design and, for example, the length and the diameter may be less than 300 mm and 100 mm, respectively. Further, the total volume of the module 50 can be 2300 cm³ or less.

Moreover, it is possible to construct a more compact module by including additional multi-tubular elements, such as the elements 36, 38, 40, 42 as shown in FIGS. 11 (d) to (g). For example, if additional multi-channel type elements 42 (e.g. φ2 mm×91 channels) are utilized as showed in FIG. 11 (g), the total volume of the module will be less (about ⅕$^{th}$ of the above-mentioned cylindrical module 50). Furthermore, if a relatively high feed side pressure (e.g. 0.5 MPa) is applied to such a module, it is possible to further reduce the unit size of the module that is capable of generating 1 kW of electric power.

As mentioned above, the multi-layer plate type configuration as shown in FIG. 13 is also suitable for commercial application of the present teachings. For example, the multi layer plate reactor 60 shown in FIG. 13 provides about 800 cm$^2$ of membrane surface area if eight support plates 61 (100 mm×100 mm×1 mm) are disposed in parallel at 1 mm intervals. The gas, which preferably comprises hydrogen and a target oxidizable molecule, is feed into gas feed inlet 64 and the permeated gas is discharged at outlet 65. Gas that did not permeate the zeolite membrane may be discharged at outlet 66. This reactor 60 can generate sufficient hydrogen to produce 1 kW of energy and can be constructed with a volume of less than 200 cm$^3$ (typically, 150-200 cm$^3$). The plate-type reactor 60 may be particularly suitable for use with a personal computer and other small mobile electronic devices, because only several cubic centimeters of the plate type element 60 would be sufficient to generate 0.03 kW of power, which is a common power requirement for such mobile electronic devices.

According to the present zeolite membranes and the various reactors described herein, the oxidizable gases are oxidized at the surface of the zeolite membrane, because the oxidation catalyst is supported on the membrane surface (on the outer surface and/or inside the fine pores or both). Thus, the target oxidizable gas molecules can be oxidized and converted into other substances while permeating the membrane without an excessive decrease in the size of fine pores of the membrane. As a result, the target oxidizable gas molecules do not readily permeate through the zeolite membrane, even though a high permeation flow rate may be utilized. Thus, because relatively high flux rates are possible without a reduction of oxidation selectivity, these zeolite membranes are suitable for practical applications. Moreover, because the zeolite membrane is quite thin, the amount of materials used to form the zeolite membrane, i.e. the porous starting materials and noble metals, are relatively small as compared to known bed reactors. Thus, the present zeolite membranes are much more cost effective and more efficient than known bed reactor systems.

The invention claimed is:

1. A method of making a substantially defect-free Y-type zeolite membrane, comprising:
   rubbing X-type zeolite particles into a porous ceramic support surface,
   contacting the porous ceramic support surface with a solution of Y-type zeolite starting materials,
   heating and pressurizing the porous ceramic support surface and the zeolite starting materials, thereby forming the Y-type zeolite membrane on the porous ceramic support, and
   introducing at least one metal into the zeolite membrane, wherein the at least one metal possesses the property of oxidizing target molecules.

2. A method according to claim 1, wherein the at least one metal is platinum.

3. A method for selectively oxidizing carbon monoxide in a gaseous mixture of carbon monoxide gas disposed within an excess of hydrogen gas, comprising:
   forcing the gaseous mixture through a substantially defect-free Y-type zeolite membrane having the property of selectively absorbing carbon monoxide within gas-permeable fine pores having an average diameter between about 0.3 nm and about 1 nm, and
   contacting the absorbed carbon monoxide gas with at least one metal disposed within the substantially defect-free Y-type zeolite membrane, thereby selectively oxidizing the carbon monoxide gas without significantly oxidizing the hydrogen gas.

4. A method according to claim 3, wherein the gaseous mixture is forced through the zeolite membrane at a temperature of about 200-300° C.

5. A method according to claim 4, wherein the substantially defect-free zeolite membrane has a thickness of between about 0.1 micron and about 50.0 microns.

6. A method according to claim 5, wherein the substantially defect-free zeolite membrane is supported on a porous support.

7. A method according to claim 6, wherein the porous support is a porous alumina support.

8. A method according to claim 3, wherein substantially defect-free zeolite membrane has a thickness of between about 0.1 micron and about 50.0 microns.

9. A method according to claim 3, wherein the at least one metal is platinum.

10. A method according to claim 3, wherein the substantially defect-free Y-type zeolite membrane is prepared by a process comprising:
    rubbing X-type zeolite particles into a porous ceramic support surface,
    contacting the porous ceramic support surface with a solution of Y-type zeolite starting materials with an alkali metal ion substitution,
    heating and pressurizing the porous ceramic support surface and the zeolite starting materials, thereby forming the Y-type zeolite membrane with an alkali metal ion substitution on the porous ceramic support, and
    introducing at least one metal into the zeolite membrane by an ion exchange method, wherein the at least one metal possesses the property of oxidizing target molecules.

* * * * *